(12) United States Patent
Iwasaki et al.

(10) Patent No.: US 6,278,843 B1
(45) Date of Patent: Aug. 21, 2001

(54) OPTICAL INSTRUMENT EQUIPPED WITH ZOOM LENS

(75) Inventors: Hiroyuki Iwasaki; Yukitaka Takeshits, both of Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/571,735

(22) Filed: May 15, 2000

(30) Foreign Application Priority Data

May 13, 1999 (JP) .................................................. 11-132409

(51) Int. Cl.$^7$ ...................................................... G03B 17/00
(52) U.S. Cl. ................................ 396/72; 396/75; 396/76; 396/79; 396/85; 396/348; 396/349; 359/704; 359/701

(58) Field of Search ................................. 396/75, 72, 348, 396/349, 76, 79, 85; 359/695, 700, 701, 694, 699, 704

*Primary Examiner*—Russell Adams
*Assistant Examiner*—Rochelle Blackman
(74) *Attorney, Agent, or Firm*—Young & Thompson

(57) ABSTRACT

An optical instrument equipped with a zoom lens installed in a zoom lens barrel having a lens guide arrangement for zooming up and down and focusing which includes a zooming-up guide path for guiding the lens group and positioning it in one of fixed zoom positions during zooming-up, a zooming-down guide for guiding the lens group and positioning it in one of fixed zoom positions during zooming-down, and focusing guide paths arranged parallel to one another and connect the zooming-up and zooming-down guide path in the fixed zoom position for guiding the lens group during focusing after zooming up or down to one of the fixed zoom position.

6 Claims, 15 Drawing Sheets

OPTICAL INSTRUMENT EQUIPPED WITH ZOOM LENS

BACKGROUND OF THE INVENTION

1. Field of the Invention

The present invention relates to an optical instrument equipped with a zoom lens such as a photographic camera, an electronic still camera, a video camera, an overhead projector, a regular projector and the like.

2. Description of Related Art

Typically, various optical instruments such as cameras are equipped with zoom lenses. Such a zoom lens has two principle functions, namely a zooming function of varying a focal length to change the magnification of an image and a focusing function of focusing the zoom lens on an aimed object to form a sharp image. These two functions are achieved by causing relative movement of a plurality of lens elements of the zoom lens partly or wholly along the optical axis of the zoom lens.

There have been known various zoom lens drive systems (a)–(d) for achieving the two functions.

(a) Two motor system in which two electric motors are used to drive a focusing mechanism and a zooming mechanism, separately;

(b) One motor system in which a single electric motor is used to drive selectively a focusing mechanism and a zooming mechanism;

(c) A step zoom system adapted to cause zooming at a plurality of fixed zoom ratios in which a single electric motor is used to alternately drive a focusing mechanism and a zooming mechanism while the motor rotates in one direction such as known from, for example, Japanese Patent Publication No. 6(1994)-100707, and (d) System that has been developed and installed in cameras on the market in the name of, "Epion 210 Zoom" and "Epion 270 Zoom" by the applicant of this application. In this unique system, there is provided rotational play between lens barrels of the zoom lens in which a plurality of lens groups are installed, respectively. For example, one of the lens barrels rotates following another lens barrel which is driven in one direction by an electric motor during zooming-up operation, and remains stationary until the other lens barrel is driven in the other direction through a rotational angle equivalent to the rotational play and rotates following the other lens barrel after the rotation of the other lens barrel through the rotational angle equivalent to the rotational play during zooming-down operation after the zooming-up operation. The zoom lens is adjusted in focus by means of relative rotation between the two lens barrels.

The first two zoom lens drive systems (a) and (b) need a number of constructional parts, which is always disadvantageous in terms of size and cost reduction. The third zoom lens drive system has to have lens barrels having large angles of rotation for an increased number of fixed zoom positions, which results in providing a complex driving mechanism and increasing the overall size of the zoom lens and making the camera bulky. The zoom lens drive system (d) is simple in mechanism and needs only a small number of constructional parts. However, there is a disadvantage that stops positions of the one lens barrel are inaccurate in the extent of the rotational play due to no members for restraining the one lens barrel in the fixed zoom positions and, in consequence, the one lens barrel is possibly displaced in position due to and impact, which leads to an image out of focus.

SUMMARY OF THE INVENTION

It is therefore an object of the present invention to provide an optical instrument equipped with a zoom lens which provides a simplified and reliable mechanism for zooming and focusing.

According to one aspect of the present invention, the foregoing object is accomplished by an optical instrument equipped with a zoom lens which comprises a plurality of lens groups including at least a first lens group and a second lens group axially movable relatively to each other for focusing the zoom lens and installed in a lens barrel provided with zooming guide path means, such as a zooming cam groove, for guiding axially the first lens group when moving axially the second lens group in one of axial directions for zooming and focusing guide path means, such as focusing cam grooves, intersecting the zooming guide path means for guiding axially the first lens group when moving axially the second lens group in another axial direction for focusing the zoom lens on an aimed object. The lens barrel provided with the zooming guide path means and the focusing guide path means which intersect the zooming guide path means causes axial movement of the first lens group along the zooming guide path means or the focusing guide path means according to directions of axial movement of the second lens group. The lens barrel thus configured realizes a simplified mechanism for both zooming and focusing.

According to another aspect of the present invention, the foregoing object is accomplished by an optical instrument equipped with a zoom lens of a step zoom type having a plurality of fixed zoom positions which comprises a plurality of lens groups including at least a first lens group and a second lens group axially movable relatively to each other, the first lens group being axially movable relatively to the second lens group for focusing in each the fixed zoom position, and installed in a lens barrel provided with a zooming-up guide path, such as a zooming-up cam groove, having the fixed zoom positions along which the first lens group is guided to move in a zooming-up direction and positioning the first lens group in one of the fixed zoom positions for zooming-up, a zooming-down guide path, such as a zooming-down cam groove, arranged parallel to the zooming-up guide path and having the fixed zoom positions along which the first lens group is guided to move in a zooming-down direction and positioning the first lens group in one of the fixed zoom position for zooming-down, and a plurality of focusing guide paths provided arranged parallel to one another and connecting the zooming-up guide path and the zooming-down guide path at the fixed zoom positions, respectively, each focusing guide path axially guiding and moving the first lens group relatively to the second lens group for focusing. The lens barrel provided with the zooming-up guide path, the zooming-down guide path and the focusing guide paths which intersect the zooming-up and the zooming-down guide path at the fixed zoom positions realizes a simplified mechanism for both zooming and focusing.

In this instance, the zooming-up guide path, the zooming-down guide path and the focusing guide paths comprise cam grooves, respectively, all of which are connected to one another. A cam follower is urged by, for example, a spring against the cam grooves. The cam groove for the zooming-up guide path is provided with angled stops in the fixed zoom positions on the zooming-up guide path that prevent the come follower from moving beyond the fixed zoom position on the zooming-up guide path and force the cam follower to enter the cam groove for the focusing guide path when zooming down the zoom lens and when focusing the zoom lens after zooming up the zoom lens, and the cam groove for the zooming-down guide path is provided with angled stops in the fixed zoom positions on the zooming-down guide path that prevent the cam follower from moving beyond the fixed zoom position on the zooming-down guide path and force the cam follower to enter the cam groove for the focusing guide path when zooming up the zoom lens and when focusing the zoom lens after zooming down the zoom lens. Employing the cam grooves with the angled stops in the fixed zoom positions and the spring urged cam follower provides reliable ingress of the cam follower into one of the focusing cam groove from the zooming-up cam groove or the zooming-down cam groove.

The cam follower may be configured so as to move in the cam grooves for the zooming-up guide path and the zooming-down guide path keeping in contact with a wall of each of the cam grooves for the zooming-up guide path and the zooming-down guide path that is remote from the cam grooves for the focusing guide paths and shifting toward a wall of each of the cam grooves for the zooming-up guide path and the zooming-down guide path that is adjacent to the cam grooves for the focusing guide paths so as to enter the cam grooves for the focusing guide path when zooming down the zoom lens from one of the fixed zoom positions along the zooming-up guide path or zooming-up the zoom lens from one of the fixed zoom positions along the zooming-down guide path and when focusing the zoom lens after zooming up or zooming down the zoom lens. Utilizing the difference of guiding the cam follower along the cam groove between zooming-up and zooming-down ensures ingress of the cam follower into one of the focusing cam grooves from the zooming-up cam groove or the zooming-down cam groove.

The optical instrument equipped with a zoom lens is provided with a reversible motor for driving the lens barrel in opposite directions to zoom up or down the zoom lens and focus the zoom lens and motor control means for controlling the reversible motor to rotate in one of the opposite directions so as to move the first lens group along the cam groove for zooming-up guide path, thereby placing the zoom lens in a desired one of the fixed zoom positions on the zooming-up guide path, to rotate in another of the opposite directions so as to move the first lens group along one of the cam grooves for the focusing guide paths adjacent to the desired fixed zoom position on the zooming-up guide path, thereby focusing the zoom lens after zooming up the zoom lens, to rotate in the another direction so as to move the first lens group along the cam groove for zooming-down guide path, thereby placing the zoom lens in a desired one of the fixed zoom position on the zooming-down guide path, and to rotate in the one direction so as to move the first lens group along one of the cam grooves for the focusing guide paths adjacent to the desired fixed zoom position on the zooming-down guide path, thereby focusing the zoom lens after zooming down the zoom lens.

Otherwise, the motor control means may control the reversible motor to rotate in one of the opposite directions so as to move the first lens group along the cam groove for zooming-up guide path, thereby placing the zoom lens in a desired one of the fixed zoom positions on the zooming-up guide path, to rotate in another of the opposite directions so as to move the first lens group along the cam groove for zooming-down guide path, thereby placing the zoom lens in a desired one of the fixed zoom positions on the zooming-down guide path, to rotate in the one direction so as to move the first lens group along one of the cam grooves for the focusing guide paths adjacent to the desired fixed zoom position on the zooming-down guide path until the zoom lens is placed in one of the fixed zoom positions on the zooming-up guide path that is adjacent to the one focusing guide path subsequently to zooming down the zoom lens, and to rotate in the one direction so as to move the first lens group along one of the cam grooves for the focusing guide paths for focusing the zoom lens.

The lens barrel thus configured realizes a simplified mechanism including only one reversible motor for both zooming and focusing.

In the above embodiments, each of the lens groups of the zoom lens typically comprises a plurality of lens elements and, however, may comprises a single lens element.

BRIEF DESCRIPTION OF THE DRAWINGS

The above and other objects and features of the present invention will be clearly understood from the following detailed description with references to preferred embodiments thereof when reading in conjunction with the accompanying drawings, wherein the same reference numerals have been used to denote the same or similar parts and in which.

DETAILED DESCRIPTION OF THE INVENTION

In the following description, parts which are not of direct importance to the invention and parts which are purely of conventional will not be set out in detail since their construction and operation can be easily arrived at by those skilled in the art.

Figure 1:
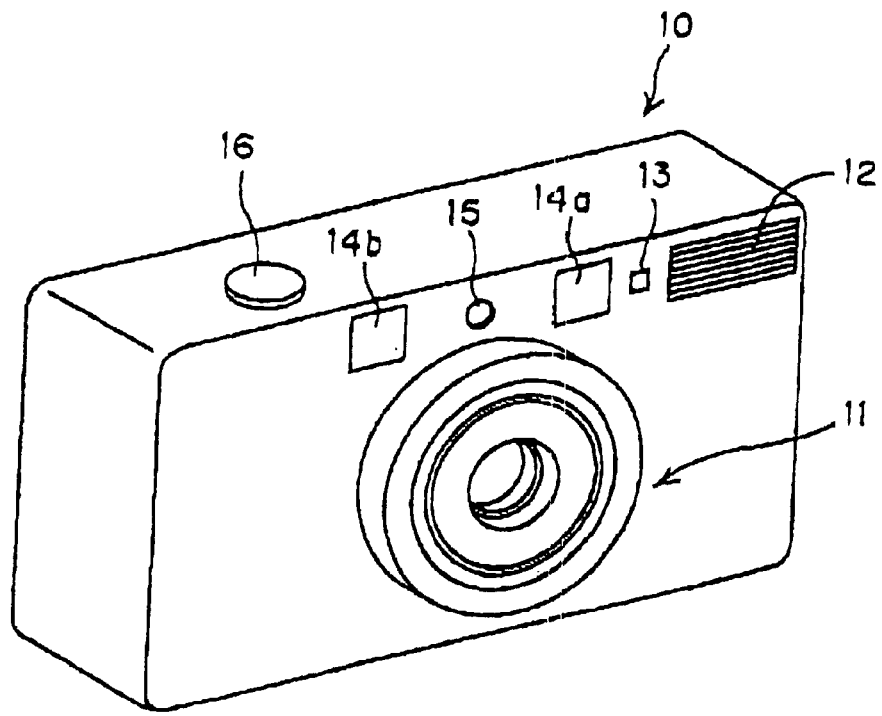
FIG. 1 is a perspective front view of a camera with a zoom lens in accordance with a preferred embodiment of the present invention in which the zoom lens is in a collapsed extreme position.
Figure 2:
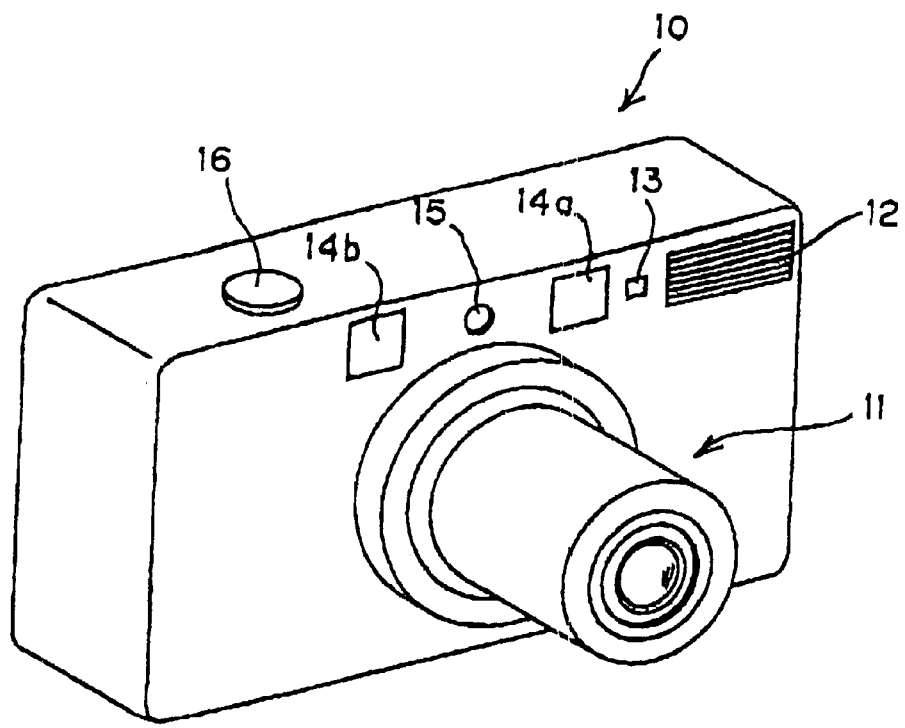
FIG. 2 is a perspective front view of the camera in which the zoom lens is in a protruded extreme position.
Figure 3:
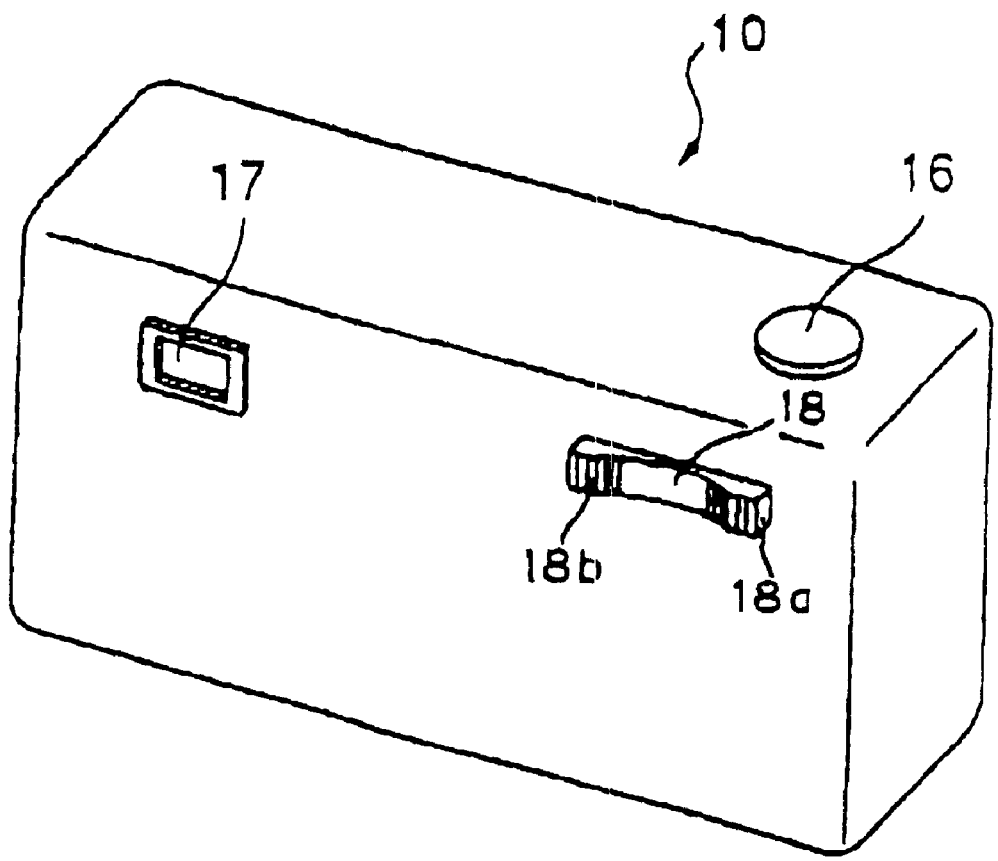
FIG. 3 is a perspective rear view of the camera.

Referring to the drawings in detail, and, in particular to FIGS. 1 to 3 showing a camera equipped with a zoom lens by way of example, a camera body 10 has a collapsible lens barrel 11 with a zoom lens system (not shown) installed therein which is movable between a collapsed extreme position shown in FIG. 1 and a protruded extreme position shown in FIG. 2. The camera body 10 is provided with a window 12 for an electronic flash built in the camera body 10, a window 13 in which an objective lens of a view finder is installed, a window 14a through which an automatic focusing device (not shown) built in the camera body 10 projects a focusing beam to an aimed object, a window 14b through which a focusing beam that is reflected by the aimed object is directed to the automatic focusing device, and a window 15 through which an automatic exposure control system receives ambient light. All of these windows are formed in a front wall of the camera body 10. The camera body 10 is further provided with a window 17 formed in a rear wall in which an eyepiece of the view finder is installed. The camera body 10 has a shutter release button 16 disposed on a top wall thereof and a zooming lever 18 disposed on the rear wall thereof. The zooming lever 18 has two operative ends, namely a zooming-up operative end 18a and a zooming-down operative end18b. While the zooming lever 18 at the zooming-up operative end 18a remains pushed down, the collapsible lens barrel 11 moves toward the protruded extreme position shown in FIG. 2 from the collapsed extreme position shown in FIG. 1. On the other hand, while the zooming lever 18 at the zooming-down operative end 18b remains pushed down, the collapsible lens barrel 11 moves back toward the collapsed extreme position shown in FIG. 1 from the protruded extreme position shown in FIG. 2.

Figure 4A:
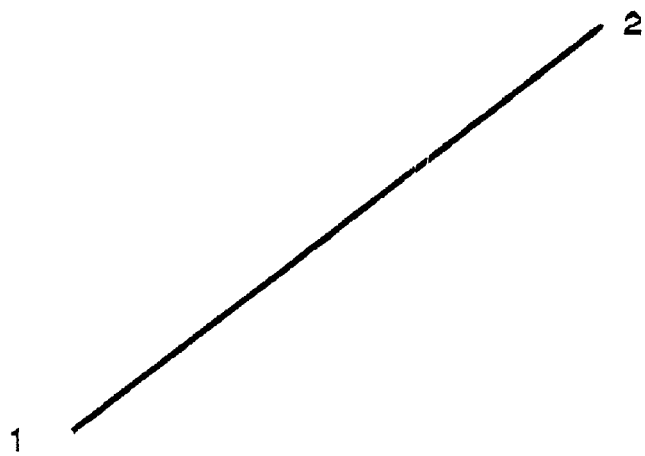
FIGS. 4A and 4B are diagrams showing a path of movement of a rear lens group of the zoom lens for focusing and zooming.
Figure 4B:
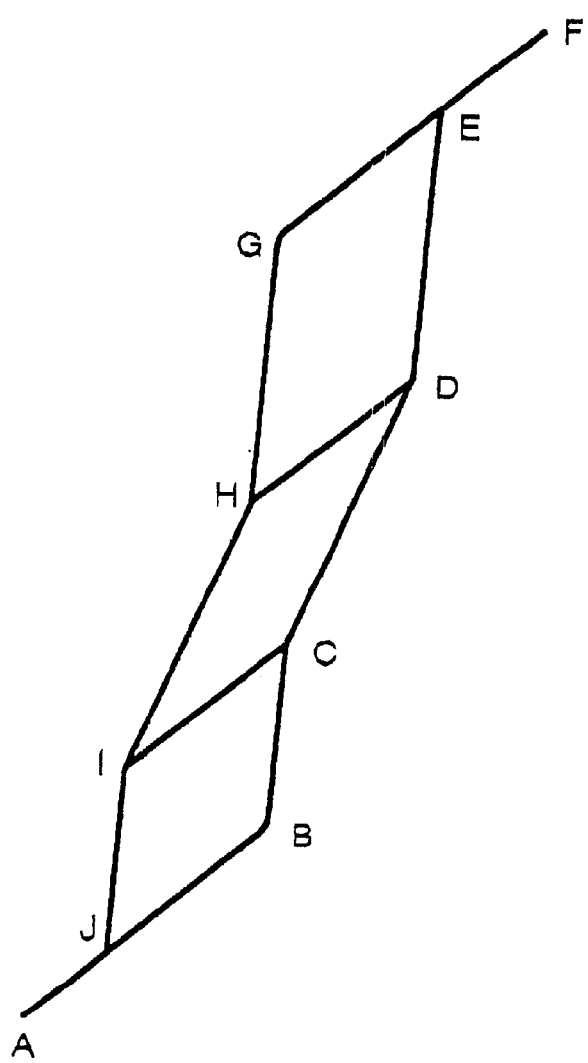

FIGS. 4A and 4B show loci of movement of the collapsible lens barrel 11 which is caused by cam grooves formed in the lens barrel 11. In FIGS. 4A and 4B, a rotational angle is used to enter the horizontal axis, and an axial distance is used to enter the vertical axis. The zoom lens system comprises, for example in this embodiment, a front lens group 120 (see FIGS. 5 and 6) which is movable linearly with respect to rotational angle of the lens barrel 11 along a locus as shown in FIG. 4A and a rear lens group 130 (see FIGS. 5 and 6) which is movable relatively to the front lens group 120 along a locus as shown in FIG. 4B. The locus shown in FIG. 4B comprises various paths, namely a zooming-up guide path B-C-D-E, a zooming-down guide path G-H-I-J, four focusing guide paths J-B, C-I, D-H and E-G each of which connects the zooming-up guide path B-C-D-E and the zooming-down guide path G-H-I-J to each other. In this instance, zooming is effected at specific positions, namely first, second, third and fourth fixed zoom-up positions B,C,D and E, respectively, only along the zoom-up guide path B-C-D-E or first, second, third and fouth fixed zoom-down positions J,I,H and G, respectively, only along the zooming-down guide path G-H-I-J. The zooming-up cam section B-C-D-E has a home position A at the end of an extension J-A from the first fixed zoom-up position B, and the zooming-down cam section G-H-I-J has a home position F at the end of an extension E-F from the first fixed zoom-down position G. Specifically while the zooming lever 18 at the zooming-up operative end 18a remains pushed down, the rear lens group 130 moves to the protruded extreme position F and then moves back to and stops in the fourth zoom position E. When releasing the zooming lever 18 at the zooming-up operative end 18a during movement of the rear lens group 130 toward the fourth zoom position E, the rear lens group 130 moves in a zooming-up direction to a closest zoom position. Otherwise, zooming control may be made such that, when releasing the zooming lever 18 during movement of the rear lens group 130 in the zooming-up direction to one of the zoom positions, the rear lens group 130 moves back in a zooming-back direction to the zoom position that the rear lens group 130 has passed once. Similarly, when releasing the zooming lever 18 at the zooming-down operative end 18b during movement of the rear lens group 130 in the zoom-down direction toward one of the zoom positions, the rear lens group 130 moves back in a zooming-down direction to a closest zoom position. Otherwise, the zooming control may be made such that, when releasing the zooming lever 18 during movement of the rear lens group 130 in the zooming-down direction toward a zoom position, the rear lens group 130 moves back in the zooming-up direction to the zoom position that the rear lens group 130 has passed once.

Zooming may be controlled in the following different way. On condition that the rear lens group 130 moves along the zooming-up guide path B-C-D-E in the zooming-up direction in the same way as described above, when releasing the zooming lever 18 at the zooming-down end 18b during movement of the rear lens group 130 in the zooming-down direction, after the rear lens group 130 stops at one of the zoom positions G, H, I and J, it does not remain stopped at the zoom position but further moves along one of the focusing guide paths J-B, C-I, D-H, and E-G that extends from the one zoom position on the zooming-down guide path G-H-I-J to a zoom position on the zooming-up guide path B-C-D-E to which the one focusing guide path extends and stands by the zoom position on the zooming-up guide path B-C-D-E.

Figure 5:
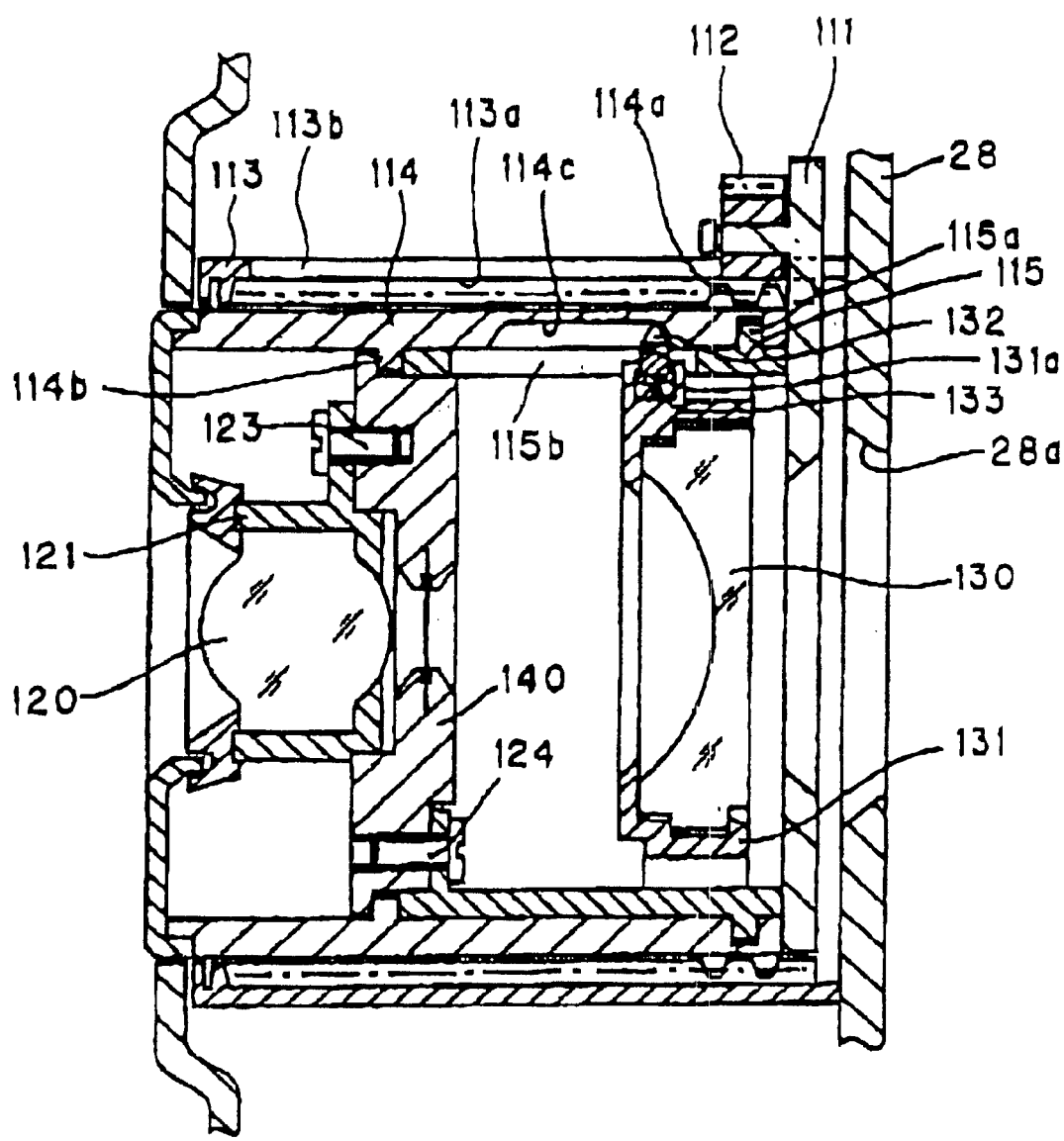
FIG. 5 is a cross-sectional view of the zoom lens which is in the collapsed extreme position.
Figure 6:
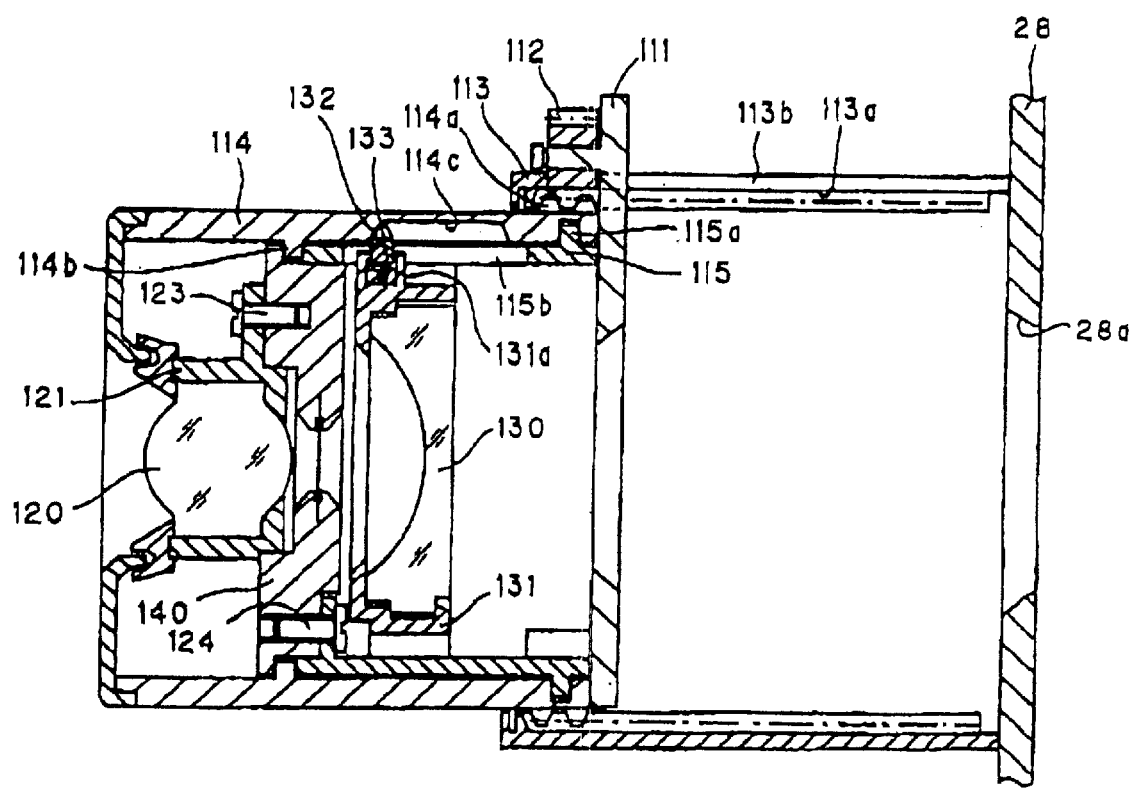
FIG. 6 is a cross-sectional view of the zoom lens which is in the protruded extreme position.

The following description will be directed to focusing and zooming operation of the lens barrel 11 with reference to FIGS. 5 and 6 which are cross-sectional views showing the lens barrel 11 in the collapsed extreme position and in the protruded extreme position, respectively.

Zooming-up Operation:

When pushing down the zooming lever 18 at the zooming-up operative end 18a, a lens drive reversible motor 318 (see FIG. 14) is actuated to rotate in a forward direction and rotate a drive gear 112 that is mounted on a movable aperture plate 111. Rotation of the drive gear 112 is transmitted to a cam barrel 114 through external helical threads 114a integrally formed with the cam barrel 114 via an idle gear (not shown) so as to turn the cam barrel 114 in a counterclockwise direction as viewed from the back of the camera body 10. An exposure aperture frame 28 which defines an exposure aperture 28a is secured to a part of the camera body 10 and is fixedly provided with a stationary barrel 113 formed with internal helical threads 113a which are in mesh with the external helical threads 114a of the cam barrel 114. Rotation of the cam barrel 114 causes its own axial movement through engagement of the helical threads 114a with the helical threads 113a of the stationary barrel 113. A shutter unit 140 is secured to a guide barrel 115 as a linear movement guide by set screws 124 (only one of which is shown). A front lens holder 121 for holding the front lens group 120 is secured to the shutter unit 140 by set screws 123 (only one of which is shown). The shutter unit 140 and the guide barrel 115 are supported by ribs 114b and 115a for rotation relative to the cam barrel 114. By the structure of the lens barrel 11, while the cam barrel 114 rotates and axially move to protrude, the movable aperture plate 111, and hence the guide barrel 115 secured to the aperture plate 111, moves straight forward as one whole with a key (not shown) integral with the aperture plate 111 guided by an axial straight guide groove 113b formed in the stationary barrel 113. A rear lens holder 131 for holding the rear lens group 130 is supported by the guide barrel 115 for sliding movement relative to the guide barrel 115 and has an external radial leg 131a which engages in an axial straight guide groove 115b formed in the guide barrel 115 and a cam follower pin 132 that is urged toward the cam barrel 114 by a spring 133 to engage a cam groove 114c of the cam barrel 114. Through this configuration, the rear lens holder 131 is moved straight forward through the engagement between the radial leg 131a and the axial straight guide groove 115b and the engagement between the cam follower pin 132 and the cam groove 114c following rotation and axial movement of the cam barrel 114.

Figure 7:
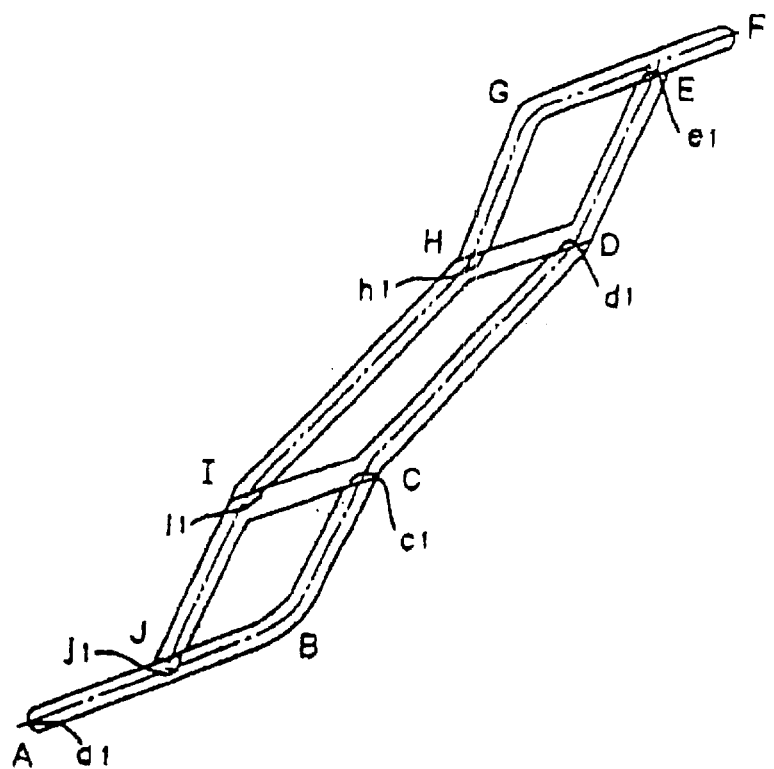
FIG. 7 is a plan view of a cam groove arrangement.
Figure 8:
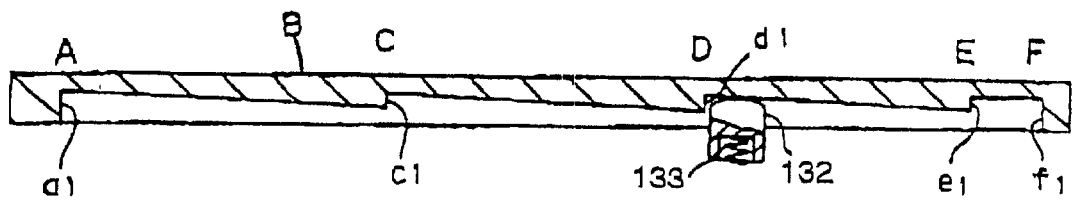
FIG. 8 is a cross sectional view of a zooming-up cam section.
Figure 9:
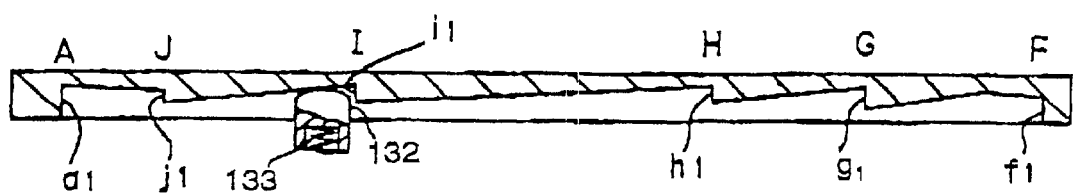
FIG. 9 is a cross-sectional view of a zooming-down cam section.

FIG. 7 shows a cam groove arrangement forming the focusing guide path and the zooming guide path in detail. A cam groove for the zooming-up guide path B-C-D-E has angled stops c1, d1 and e1 in the fixed zoom-up positions C, D and E and a1 and f1 in the extreme positions A and F as shown in FIG. 8. A cam groove for the zooming-down guide path G-H-I-J has angled stops j1, i1, h1 and g1 in the fixed zoom-down positions I, J, H and G as shown in FIG. 9. The cam groove arrangement is configured such that, when the lens drive motor 318 turns over in rotation from a normal direction to a reverse direction during movement of the cam follower pin 132 of the rear lens holder 131 in the zooming-up direction in the zooming-up guide path, the cam follower pin 132 is forced to enter one of the focusing guide paths without moving back in the zooming-down direction in the zooming-up guide path and, when the lens drive motor 318 turns over in rotation from the reverse direction to the normal direction during movement of the cam follower pin 132 of the rear lens holder 131 in the zooming-down direction, the cam follower pin 132 is forced to enter one of the focusing guide paths without moving back in the zooming-up direction in the zooming-down guide path, as will be described in detail later. The cam groove 114c in which the cam follower pin 132 of the rear lens holder 131 moves comprises a zooming-up cam section (zooming-up guide path) B-C-D-E, a zooming-down cam section (zooming-down guide path) G-H-I-J and focusing cam sections B-J, C-I, D-H and E-G extending between the zooming-up cam sections B-C-D-E and the zooming-down cam section G-H-I-J. When the cam follower pin 132 of the rear lens holder 131 moves along the zooming-up cam section B-C-D-E in the zooming-up direction from the first fixed zoom-up position B toward the fourth fixed zoom-up position E, the zoom lens varies its angle of view from a wide-angle end to a telephoto end. As was previously described, in this embodiment, when zooming operation is interrupted at a desired focal length during zooming-up, the cam follower pin 132 does not stop in an inbetween position between adjacent two fixed zoom-up positions but moves forward and stops in a forward fixed zoom-up position through the step zoom control. For example, even when zooming operation is interrupted when the cam follower pin 132 of the rear lens holder 132 is in an inbetween position between the second fixed zoom-up position C and the third fixed zoom-up position D, the cam follower pin 132 of the rear lens holder 131 is moved further forward to and stops at the third fixed zoom-up position D. If desirable, as was previously described, the cam follower pin 132 of the rear lens holder 131 may be moved back and stopped at the second fixed zoom-up position C. Either one of forward positioning of the rear lens holder 131 and backward positioning of the rear lens holder 131 is employed in consideration of optical and mechanical characteristics of the optical instrument equipped with the zoom lens, positions which the rear lens group 130 occupies when interrupting zooming operation, a control system that is employed and the like. In this embodiment, the forward positioning is employed.

Zooming-down Operation

When the zooming lever 18 at the zooming-down operative end 18b is pushed down when the lens barrel 11 is in the protruded extreme position shown in FIG. 2, the lens drive motor 318 is actuated to rotate in the reverse direction and rotate the drive gear 112. Rotation of the drive gear 112 is transmitted to the cam barrel 114 through the external helical threads 114a integrally formed with the cam barrel 114 via the idle gear so as to turn the cam barrel 114 in a clockwise direction as viewed from the back of the camera body 10. Movable parts are caused to rotate or move in directions opposite to the directions in which the movable parts rotates or moves when the lens drive motor 318 rotates in the counterclockwise direction for zooming-up operation. The cam barrel 114 rotates and moves backward to collapse into the camera body 10. During the collapsing movement of the lens barrel 11, the cam follower pin 132 of the rear lens holder 131 is guided by the cam groove 114c and moved backward. During the zooming-down, the cam follower pin 132 of the rear lens holder 131 moves along the zooming-down cam section G-H-I-J in the zooming-down direction from the fourth fixed zoom-down position G toward the first fixed zoom-down position J, the zoom lens varies its angle of view from the telephoto end to the wide-angle end. Similarly to the zooming-up operation, when zooming operation is interrupted at a desired focal length during zooming-down, the cam follower pin 132 does not stop in an inbetween position between adjacent two fixed zoom-down positions but moves forward and stops in a forward fixed zoom-down position through the step zoom control. For example, even when zooming operation is interrupted when the cam follower pin 132 of the rear lens holder 131 is in an inbetween position between the third fixed zoom-down position H and the second fixed zoom-down position I, the cam follower pin 132 of the rear lens holder 131 is moved further forward to and stops at the second fixed zoom-down position I.

Focusing Operation (A) Focusing Operation after zooming-up Operation:

The following description is directed to the case where the zoom lens is in the third fixed zoom-up position D where the cam follower pin 132 of the rear lens holder 131 is engaged by the angled stop d1 of the zooming-up cam section B-C-D-E shown in FIG. 8. When releasing the shutter button 16 to make exposure, the camera control actuates an automatic focusing system to detect an object distance to an aimed object and an automatic exposure control system to determine and exposure during a first half depression of the shutter button 16 as is well known in the art. When depressing the shutter button 16 in succession to its full stroke, the lens drive motor 318 is actuated to rotate in the reverse direction, so as to move the lens barrel 11 back into the camera body 10. At this time, while the front lens holder 121 moves backward toward the collapsed position, the cam follower pin 132 of the rear lens holder 131 is prevented from moving in the zooming-down direction toward the second fixed zoom-up position C on the zooming-up cam section B-C-D-E by means of the engagement with the angled stop d1 in the third fixed zoom-up position D and, however, forced to enter the focusing cam section D-H and to move toward the third fixed zoom-down position H on the zooming-down cam section G-H-I-J. During movement of the cam follower pin 132 along the focusing cam section D-H, the rear lens group 130 moves along the optical axis to shift the focal point of the zoom lens according to relative positions to the front lens group 120. When fully depressing the shutter button 16, the automatic focusing system provides a number of drive pulses in conformity with the object distance so that the lens drive motor 318 rotates until the cam follower pin 132 reaches a position on the focusing cam section D-H and then stops, thereby positioning the front lens group 120 and the rear lens group 130 to place the zoom lens in focus on the aimed object at the detected object distance. In response to a stop of the lens drive motor 318, the automatic exposure control system actuates the shutter to open for performing the determined exposure.

In this embodiment, when the exposure is completed, the lens drive motor 318 is automatically controlled to rotate until the cam follower pin 132 moves back along the focusing cam section H-D to the third fixed zoom-up position D on the zooming-up cam section B-C-D-E. That is to say, whenever exposure is completed, the zoom lens is automatically returned to a fixed zoom-up position that is previously occupied before the exposure is made. The motor control may be made such that the zoom lens is returned to a fixed zoom-up position that is previously occupied before exposure is made in response to shutter release operation for another exposure.

(B) Focusing after zooming-down:

The following description is directed to the case where the zoom lens is in the second fixed zoom-down position I where the cam follower pin 132 of the rear lens holder 131 is engaged by the angled stop d1 of the zooming-down cam section G-H-I-J shown in FIG. 9. When releasing the shutter button 16 to make exposure, the camera control actuates an automatic focusing system to detect an object distance to an aimed object and an automatic exposure control system to determine an exposure during a first half depression of the shutter button 16. When depressing the shutter button 16 in succession to its full stroke, the lens drive motor 318 is actuated to rotate in the normal direction, so as to move the lens barrel 11 forward out of the camera body 10. At this time, the cam follower pin 132 is prevented from moving in the zooming-up direction toward the third fixed zoom-down position H on the zooming-down cam section G-H-I-J by means of the engagement with the angled stop i1 in the second fixed zoom-down position I and, however, forced to enter the focusing cam section I-C to move toward the second fixed zoom-up position C on the zooming-up cam section B-C-D-E. Similarly to focusing after zooming-up described above, during movement of the cam follower pin 132 along the focusing cam section I-C, the rear lens holder 131 moves along the optical axis to shift the rear lens group 130 so as to change the focal point of the zoom lens according to relative positions of the rear lens group 130 to the front lens group 120. When fully depressing the shutter button 16 and a number of drive pulses in conformity with the object distance are provided, the lens drive motor 318 rotates and stops, so as to position the cam follower pin 132 of the rear lens holder 131 in a position on the focusing cam section I-C and then stops, thereby positioning the front lens group 120 and the rear lens group 130 to place the zoom lens in focus on the aimed object at the detected object distance. In response to a stop of the lens drive motor 318, the automatic exposure control system actuate the shutter to open for performing the determined exposure. In the same way as for focusing after zooming-up, when the exposure is completed, the zoom lens is automatically returned to the fixed zoom-down position, namely the second fixed zoom-down position I on the zooming-down cam section G-H-I-J in this case, that is previously occupied before the exposure is made.

(C) Zooming-up/down operation after exposure in one of the fixed zoom positions:

As described above, after exposure in one of the fixed zoom-up positions on the zooming-up cam section B-C-D-E, the cam follower pin 132 always moves back to the fixed zoom-up position on the zooming-up cam section B-C-D-E. For example, after having made exposure in the third fixed zoom-up position D, the cam follower pin 132 moves along the focusing cam section H-D to the third fixed zoom-up position D on the zooming-up cam section B-C-D-E and is situated in the third fixed zoom-up position D. Accordingly, when making zooming-up operation for another exposure after exposure made in the third fixed zoom-up position D, the cam follower pin 132 is moved in the zooming-up direction along the zooming-up cam section B-C-D-E toward the fourth fixed zoom-up position E directly from the third fixed zoom-up position ID. On the other hand, when making zooming-down operation for another exposure after exposure made in the third fixed zoom-up position D, the cam follower pin 132 is prevented from moving in the zooming-down direction along the zooming-up cam section B-C-D-E toward the second fixed zoom-up position C by means of the engagement with the angled stop D1 of the zooming-up cam section B-C-D-E, so at to be forced to enter the focusing cam section D-H and to move along the focusing cam section to the third fixed zoom-down position H on the zooming-down cam section G-H-I-J. When reaching the third fixed zoom-down position H, the cam follower pin 132 enters the zooming-down cam section G-H-I-J and moves along it toward the second fixed zoom-down position I or the first fixed zoom-down position J passing the second fixed zoom-down position I.

Further, after exposure that has been made in one of the fixed-zoom-down positions on the zooming-down cam section G-H-I-J, for example the second fixed zoom-down-position I, the cam follower pin 132 is returned to the second fixed zoom-down position I on the zooming-down cam section G-H-I-J. When making zooming-up operation while the cam follower pin 132 is in the third fixed zoom-down position I on the zooming-down cam section G-H-I-J, the cam follower pin 132 is prevented from moving in the zooming-up direction toward the second fixed zoom-down position H by means of the engagement with the angled stop i1, so as to be forced to enter the focusing cam section I-C and to move along the focusing cam section I-C to the second fixed zoom-up position C on the zooming-up cam section B-C-D-E. When reaching the second fixed zoom-up position C, the cam follower pin 132 enters the zooming-up cam section B-C-D-E and moves along it toward the third fixed zoom-up position D or the forth fixed zoom-up position E passing the third fixed zoom-up position D. On the other hand, when making zooming-down operation after having made exposure in the second fixed zoom-down position I, the cam follower pin 132 moves in the zooming-down direction along the zooming-down cam section G-H-I-J toward the first fixed zoom-down position J directly from the second fixed zoom-down position I.

As described above, by means of the interaction between the spring forced cam follower pin 132 and the cam groove arrangement formed with angled stops c1, d1, e1, h1, i1 and j1 at the fixed zoom positions C, D, E, H, I and J, respectively, both focusing operation and zooming operation of the zoom lens are accomplished by appropriately controlling rotation of the lens drive motor 318 in opposite directions.

FIGS. 10 to 13 show a variant of the cam groove arrangement shown in FIGS. 7 to 9 in which no angled stops at fixed zoom positions are formed. The cam groove arrangement shown in FIGS. 10 to 13 is characterized by a cam follower pin 132 that in not urged against cam grooves but fixedly attached to a rear lens holder 131 and a configuration of cam grooves for forcing the cam follower pin 132 to enter focusing cam sections.

As shown, the cam follower pin 132 secured to a rear lens holder 131 holding a rear lens group 130 is configured so as to move in a zooming-up cam section A-B-C-D-E-F in contact with a side wall remote from focusing cam sections B-J, C-I, D-H, E-G (which is hereafter referred to as an outside wall) during zooming operation and in a zooming-down cam section F-G-H-I-J-A in contact with a side wall remote from focusing cam sections B-J, C-J, D-H and E-G (which is hereafter referred to as an outside wall) during focusing-down operation. The zooming-up earn section A-B-C-D-E-F has first to fourth fixed zoom-up positions B. C, D and E, and the zooming-down cam section F-G-H-I-J-A has first to fourth fixed zoom-down positions G. H, I and J. The second and third fixed zoom-up points C and D of the zooming-up cam section A-B-C-D-E-F are located beyond curved ends c2 and d2 of the focusing cam sections C-I and D-H on the side of the zooming-up cam section A-B-C-D-E-F, respectively, in the zooming-up direction. Similarly, the second and third fixed zoom-down points H and I of the zooming-down cam section F-G-H-I-J-A are located beyond curved ends h2 and i2 of the focusing cam sections H-D and I-C on the side of the zooming-down cam section F-G-H-I-J-A, respectively, in the zooming-down direction.

Zooming-up operation

Figure 10:
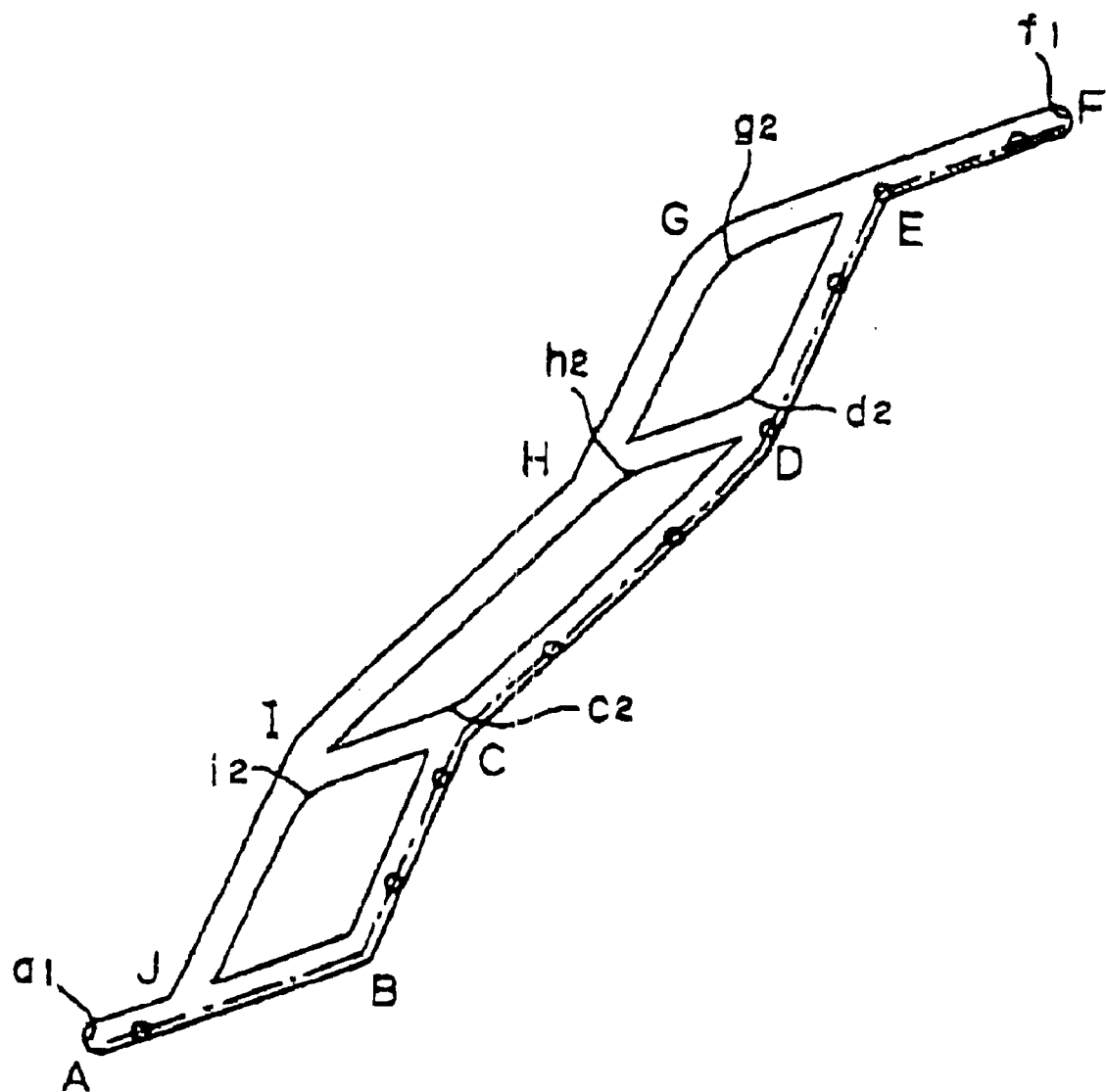
FIG. 10 is an explanatory view showing movement of a cam follower pin along a zooming-up cam section of a cam groove arrangement which is different in configuration from that shown in FIG. 7.
Figure 11:
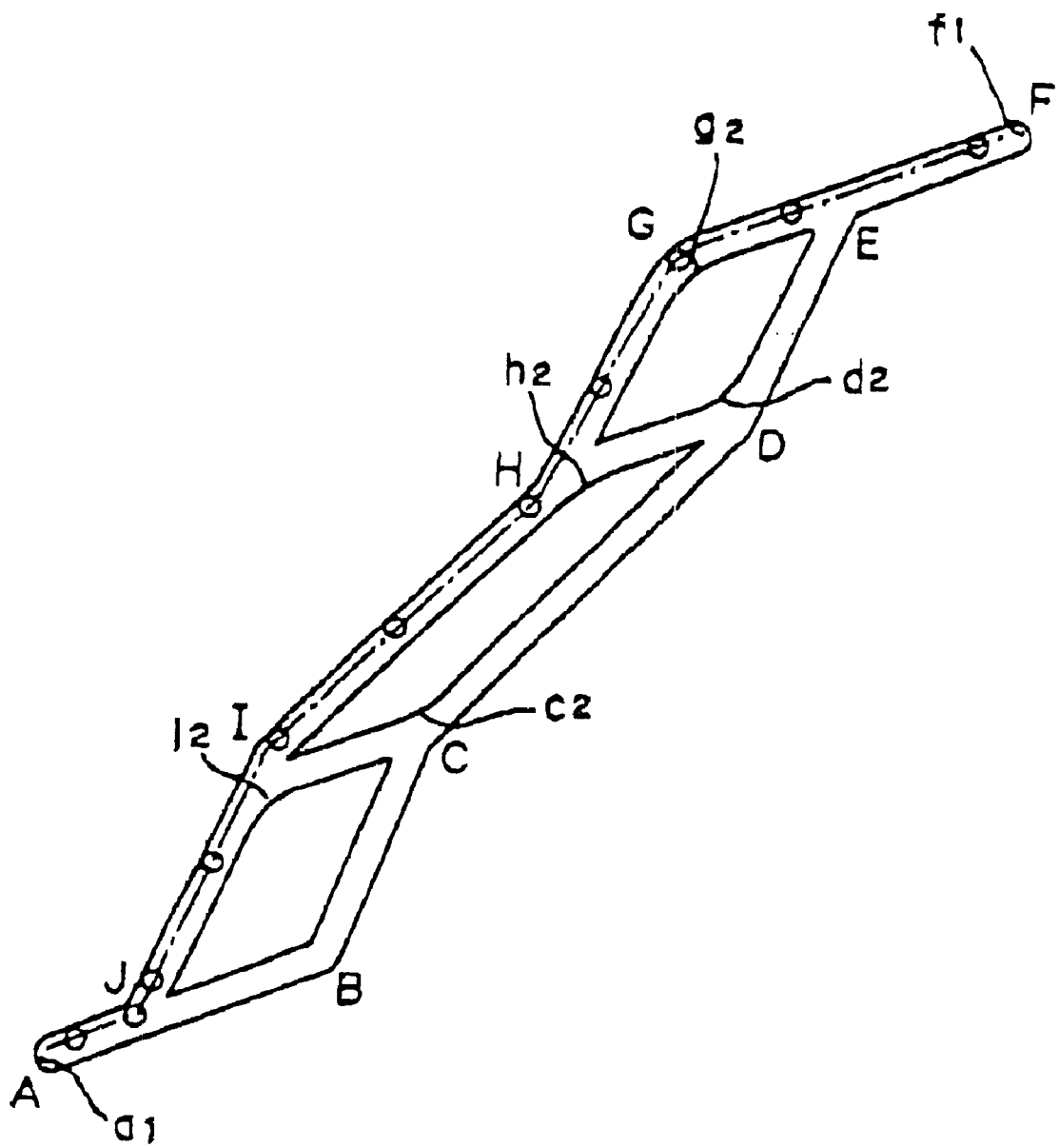
FIG. 11 is an explanatory view showing movement of a cam follower pin along a zooming-down cam section of the cam groove arrangement.

When pushing a zooming lever 18 at a zooming-up operative end 18a while a lens barrel 11 is in a collapsed extreme position where the zoom lens is placed at a wide-angle end, a lens drive motor 318 rotates in a normal direction so as to move the cam barrel 114 toward a protruded extreme position, so that the cam follower pin 132 secured to a rear lens holder 131 holding a rear lens group 130 moves along the zooming-up cam section A-B-C-D-E as shown in FIG. 10 to shift the zoom lens to the telephoto end from the wide-angle end. When releasing the zooming lever 18, the cam follower pin 132 movers to and stops at a closest forward fixed zoom-up position. For example, when releasing the zooming lever 10 when the cam follower pin 132 is an inbetween position between a second fixed zoom-up position C and a third fixed zoom-up position D on the zooming-up cam section B-C-D-E, the cam follower pin 132 further moves along the zooming-up cam section B-C-D-E to and stops at the third fixed zoom-up position D.

Zooming-down operation:

When pushing the zooming lever 18 at a zooming-down operative end 18b while the lens barrel 11 is in a protruded extreme position where the zoom lens is placed at a telephoto end, the lens driver motor 318 rotates in a reverse direction so at to mover the cam barrel 114 toward the collapsed extreme position, so that the cam follower pin 132 moves along the zooming-down cam section -G-H-I-J to shift the zoom lens to the wide-angle end from the telephoto end. When releasing the zooming lever 18, the cam follower pin 132 moves to and stops at a closest forward fixed zoom-down position. For example, when releasing the zooming lever 10 when the cam follower pin 132 is an inbetween position between a third fixed zoom-down position H and a second fixed zoom-down position I on the zooming-down cam section G-H-I-J, the cam follower pin 132 further moves along the zooming-down cam section G-H-I-J to and stops at the second fixed zoom-down position I.

Figure 12:
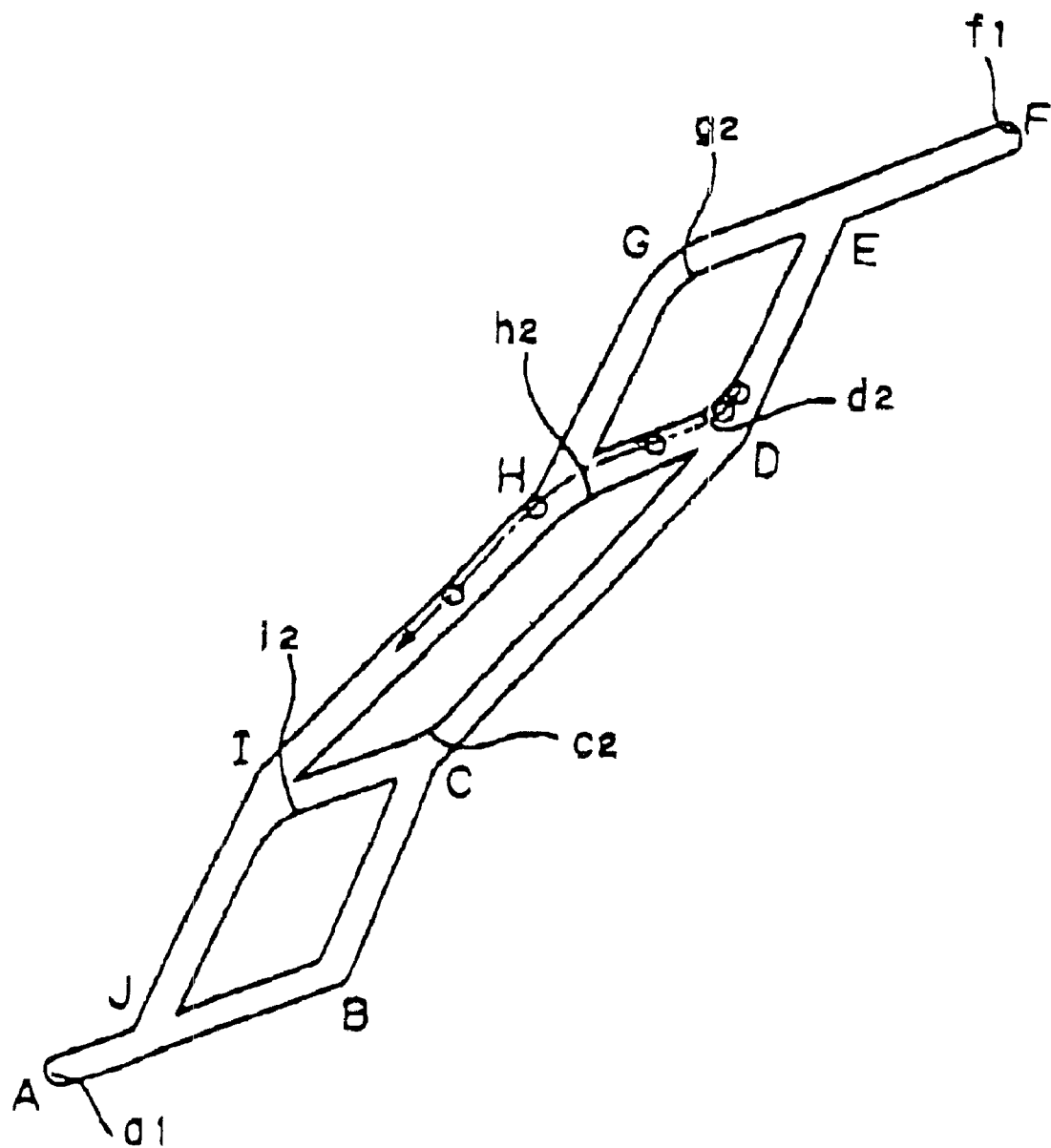
FIG. 12 is an explanatory view showing movement of the cam follower pin during focusing from one of fixed zoom-down positions.

Focusing operation (A) Focusing operation after zooming-up operation:

Describing in connection with the case where the zoom lens remains places in the third fixed zoom position by way of example as shown in FIG. 12, the cam follower pin 132 stays in the third fixed zoom-up position D on the zooming-up cam section B-C-D-E which is beyond the curved end d2 of the focusing cam section D-H. In response to pushing a shutter release button 16 for making exposure, the lens driver motor 318 rotates in the reverse direction to cause backward movement of the lens barrel 11 toward the wide-angle end in the same manner as described in connection with the cam groove arrangement shown in FIGS. 7 to 9. As a result, the cam follower pin 132 is forced to move and abut against a wall of the zooming-up cam section B-C-D-E on the side of the focusing cam sections E-G (which is hereafter referred to as an inside wall) and guided by the curved end d2 of the focusing cam section D-H to enter and move along the focusing cam section D-H. During movement of the rear lens holder 131 along the focusing cam section D-H, the rear lens group 130 shifts in axial position to change the focal point of the zoom lens according to relative positions to the front lens group 120. Thereafter, exposure is accomplished in the same manner as described in connection with the cam groove arrangement shown in FIGS. 7 to 9. After the exposure, the cam follower pin 131 is automatically returned to the third fixed zoom-up position D on the zooming-up cam section B-C-D-E until contacting with the outside wall of the zooming-up cam section B-C-D-E and stops.

Figure 13:
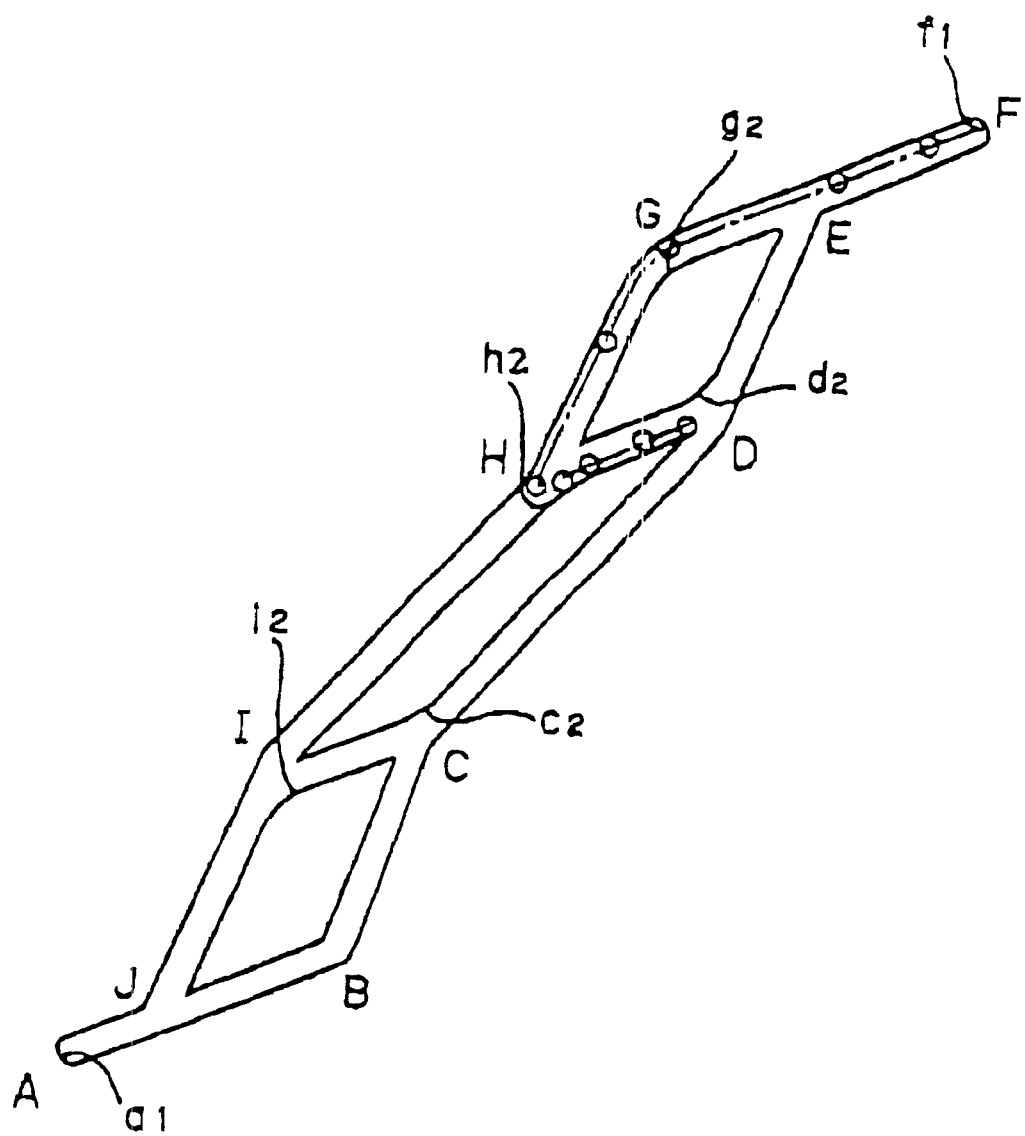
FIG. 13 is a explanatory view showing movement of a cam follower pin during focusing from one of fixed zoom-up positions.

(B) Focusing operation after zooming-down operation:

Describing in connection with the case where the zoom lens remains places in the third fixed zoom position by way of example as shown in FIG. 13, the cam follower pin 132 stays in the third fixed zoom-down position H on the zooming-down cam section G-H-I-J which is beyond the curved end h2 of the focusing cam section H-D. In response to pushing the shutter release button 16 for making exposure, the lens drive motor 318 rotates in the normal direction to cause forward movement of the lens barrel 11 toward the telephoto end in the same manner as described in connection with the cam groove arrangement shown in FIGS. 7 to 9. As a result, the cam follower pin 132 is forced to move and abut against a wall of the zooming-down cam section G-H-I-J on the side of the focusing cam sections (which is hereafter referred to as an inside wall) and guided by the curved end h2 of the focusing cam section H-D to enter and move along the focusing cam section H-D. During movement of the rear lens holder 131 along the focusing cam section H-D, the rear lens group 130 shifts in axial position to change the focal point of the zoom lens according to relative positions to the front lens group 120. Thereafter, exposure is accomplished in the same manner as described in connection with the cam groove arrangement shown in FIGS. 7 to 9. After the exposure, the cam follower pin 131 is automatically returned to the third fixed zoom-down position H on the zooming-down cam section G-H-I-J and stops.

(C) Zooming-up/down operation in one of the fixed zoom positions:

When making zooming-up operation after exposure made in one of the fixed zoom-up positions on the zooming-up cam section B-C-D-E, for example the third fixed zoom-up position D, the cam follower pin 132 which stays in the third fixed zoom-up position D on the zooming-up cam section B-C-D-E. When pushing the zooming lever 18 at the zooming-up operative end 18a, the cam follower pin 132 is moved in the zooming-up cam section B-C-D-E. On the other hand, when making zooming-down operation for another exposure after exposure made in the third fixed zoom-up point D, the cam follower pin 132, which stays in the third fixed zoom-up position D on the zooming-up cam section B-C-D-E, is forced to enter the focusing cam section D-H by means of guidance by the curved end d2 of the focusing cam section D-H and to move along the focusing cam section D-H to the third fixed zoom-down position H on the zooming-down cam section G-H-I-J. When reaching the third fixed zoom-down position H, the cam follower pin 132 enter the zooming-down cam section G-H-I-J and moves along it toward the second fixed zoom-down position I or the first fixed zoom-down position J passing the second fixed zoom-down position I keeping contact with the outside wall of the zooming-down cam section G-H-I-J.

As described above, by means of movement of the cam follower pin 132 keeping contact with the outside wall of the zooming-up cam section B-C-D-E or the zooming-down cam section G-H-I-J and the focusing cam section having a curved end located before the fixed zoom-down position, both focusing operation and zooming operation of the zoom lens are reliably accomplished by appropriately controlling rotation of the lens drive motor in opposite directions.

In the above embodiments, the number of fixed zoom positions may be increased or decreased.

Figure 14:
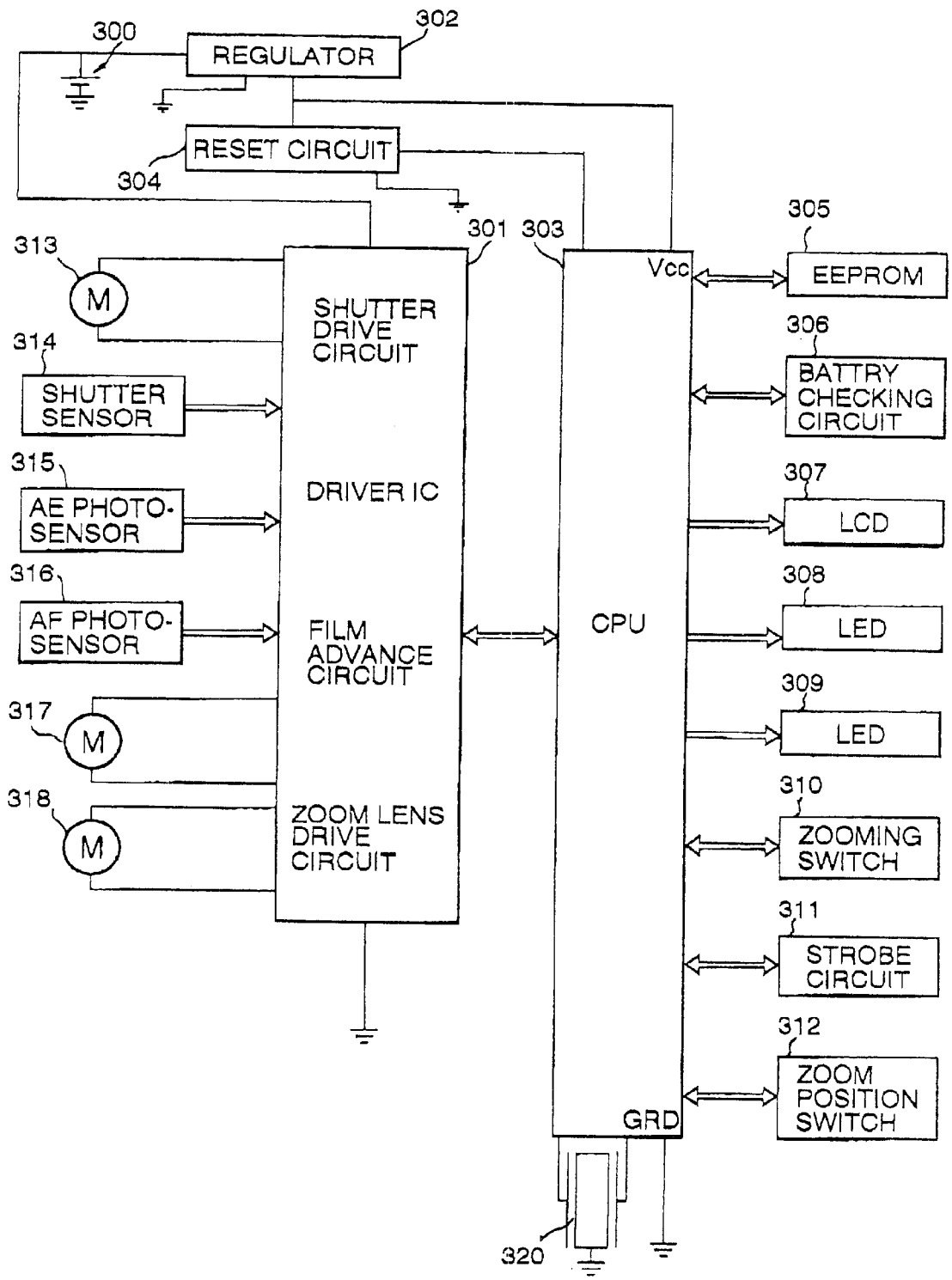
FIG. 14 is a circuit block diagram illustrating the camera.

FIG. 14 shows a block diagram of the camera shown in FIGS. 1 to 13. Some of elements shown in FIG. 14 are omitted in FIGS. 1 through 13 for simplicity.

As shown, a built-in battery 300 provides electric power which is directly supplied to a driver IC 301 and is regulated by a regulator circuit 302 and then supplied to CPU 303 comprising a microcomputer. The output voltage from the regulator 302 is monitored by a reset circuit 304 which is operative to interrupt operation of CPU 303 when monitoring an output voltage from the regulator circuit 302 lower than a lower limit level for normal operation of CPU 303 so as to prevent run-away of the camera. CPU 303 is interfaced with EEPROM 305 for storing various programs that are executed in CPU 303 and various data, a battery power checking circuit 306 for monitoring and checking an available capacity of the battery 300, LCD 307 disposed in the view finder to display various information thereon, LED 308 as an indicator, LED 309 forming part of the automatic focusing system for generating a light beam to an aimed object, a zooming switch 301 such as an on-off switch which is turned on or off by operation of the zooming lever 18, a strobe circuit 311 and a zoom position switch 312 for detecting that the zoom lens reaches the respective fixed zoom positions. CPU 303 receives signal of instructions or indications from them or provides them with control signals. CPU is equipped with a crystal oscillator 320 which generates a clock pulse necessary for operation of CPU 303. The driver IC 301 is connected to CPU 303 to receive instruction signals for driving electric motors 313, 317 and 318. Further the driver IC 301 is interfaced with a shutter sensor 314 for detecting a timing at which the shutter opens, an AE photo-sensor 315 which forms a part of the automatic exposure control system and detects brightness of a field in which an aimed object is and an AF photo-sensor 316 which forms a part of the automatic focusing system and detects an object distance.

The driver IC 301 includes motor drive circuits for actuating a shutter driver motor 313, a film advance motor 317 and the lens drive motor 318, respectively. The motor drive circuit receives a motor drive signal from CPU 303 to drive the shutter drive motor 313 so as to open and close the shutter, thereby completing exposure. The shutter remains open for a period of time that is determined according to the brightness detected by the AE photo-sensor 315 from a timing detected by the shutter sensor 314. The film advance circuit receives a motor drive-signal from CPU 303 to drive the film advance motor 317 so as to advance a film one frame whenever exposure is made and to rewind the film into a film patrone (not shown) loaded in the camera body 10 after exposure of all available frames. The lens drive circuit receives instruction signals that are provided by CPU in response to turn-on or -off of the one on-off switch 310 caused by operation of the zooming lever 18 to drive the lens drive motor 318 so as thereby to move the lens barrel 11 for focusing and zooming between the wide-angle end and the telephoto end as described above.

Figure 15A:
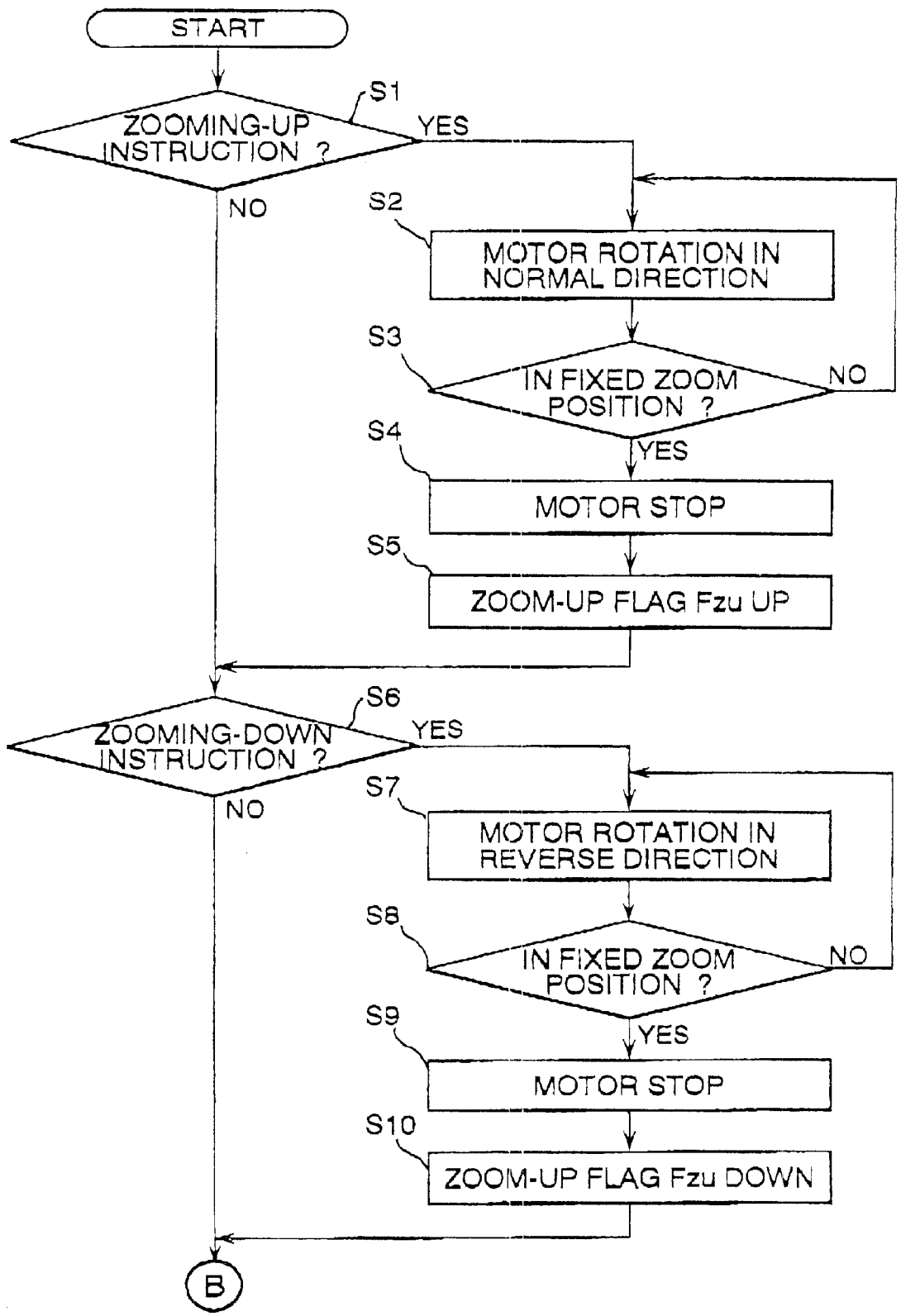
FIGS. 15A and 15B are a flow chart illustrating a sequence routine of zoom lens control.
Figure 15B:
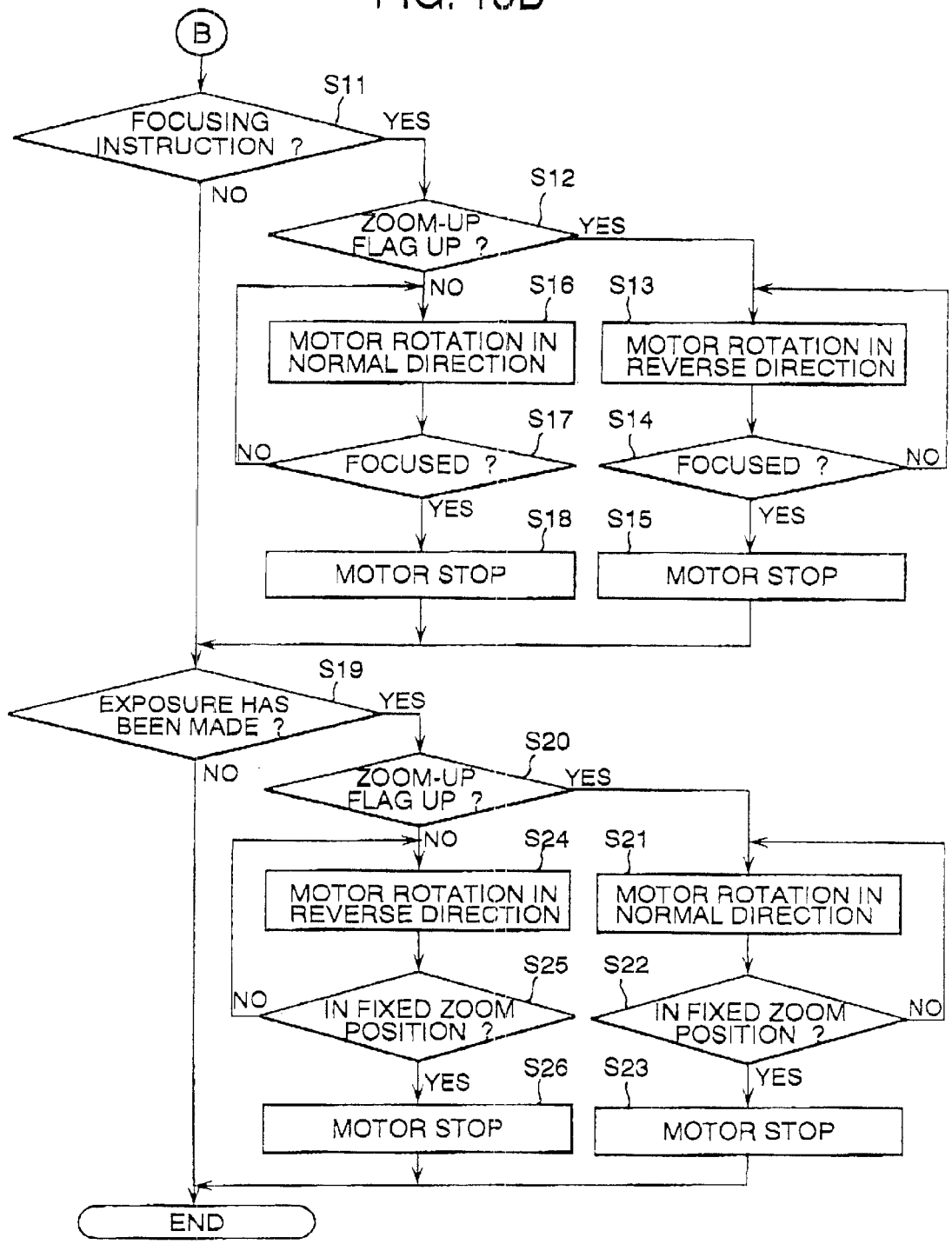

The operation of the camera depicted in FIG. 14 is best understood by reviewing FIGS. 15A and 15B which are a flow chart illustrating a sequence routine of zoom lens control for CPU 303. The program for the zoom lens control sequence routing is implemented whenever the zoom lens is driven irrespective of focusing or zooming.

When the sequence logic starts and control proceeds to a functional block at step S1 where a decision is made as to whether a zooming-up instruction signal is provided from CPU 303. When the answer to the decision is affirmative, this indicates that the zooming lever 18 at the zooming-up operative end 18a is pushed, which is detected through turn-on of the zooming switch 310, then CPU 303 provides the driver IC 300 with an actuation signal to actuate the lens drive motor 318 to rotate in the normal direction while the zooming lever 18 remains pushed down at step S2. When the zoom lens reaches on of the fixed zoom-up positions after releasing the zooming lever 18, which is detected by the zoom position switch 314, that is, when the answer to a decision made at step S3 is affirmative, then CPU 303 provides the driver IC 300 with a stop signal to stop the lens drive motor 318 at step S4 and a zoom-up flag Fzu is set up at step S5 for completing zooming-up operation. In this instance, the zooming-up flag Fzu indicates that the zoom lens has been operated for zooming-up when it is up or that it has been operated for zooming-down when it is down. When the answer to the decision concerning a zooming-up instruction signal made at step S1 is negative or subsequently to setting up the zoom-up flag Fzu at step S5, a decision is made at step S6 as to whether a zooming-down instruction signal is provided from CPU 303. When the answer to the decision is affirmative, this indicates that the zooming lever 18 at the zooming-down operative end 18b is pushed, which is detected through turn-on of the zooming switch 310, then CPU provides the driver IC 300 with an actuation signal to actuate the lens drive motor 318 to rotate in the reverse direction while the zooming lever 18 remains pushed down at step S7. When the zoom lens reaches one of the fixed zoom-down positions after releasing the zooming lever 18, which is detected by the zoom position switch 314, that is, when the answer to a decision made at step S8 is affirmative, then CPU 303 provides the driver IC 300 with a stop signal to stop the lens drive motor 318 at step S9 and a zoom-up flag Fzu is reset down at step S10 for completing zooming-down operation.

When the answer to the decision concerning a zooming-down instruction signal made at step S6 is negative or subsequently to resetting down the zoom-up flag Fzu at step S10, a decision is made at step S11 as to whether a focusing instruction signal is provided from CPU 303. When the answer to the decision is affirmative as a result of pushing down the shutter button 16 half to actuate the automatic focusing system, then another decision is made at step S12 as to whether the zooming-up flag Fzu is up. When the answer to the decision is affirmative, this indicates that zooming-up operation of the zoom lens has previously been made, then CPU 303 provides the driver IC 300 with an actuation signal to actuate the lens drive motor 318 to rotate in the reverse direction at step S13 until a given number of drive pulses in conformity with an object distance detected by the automatic focusing system have been counted up at step S14. In response to counting up the given number of pulses, CPU 303 provides the driver IC 300 with a stop signal to stop the lens drive motor 318 for completing focusing operation after zooming-up operation at step S15. On the other hand, when the answer to the decision concerning the zooming-up flag Fzu made at step S12 is negative, this indicates that zooming-down operation of the zoom lens has previously been made, then CPU 303 provides the driver IC 300 with an actuation signal to actuate the lens drive motor 318 to rotate in the normal direction at step S16 until a given number of drive pulses in conformity with an object distance detected by the automatic focusing system have been counted up at step S17. In response to counting up the given number of pulses, CPU 303 provides the drive IC 300 with a stop signal to stop the lens drive motor 318 for completing focusing operation after zooming-down operation at step S18.

When the answer to the decision concerning a focusing instruction signal made at step S11 is negative or subsequently to stopping the lens drive motor 318 at step S15 or S18, a decision is made at step S19 as to whether exposure has been made, This decision is made on the basis of detection of opening and closing the shutter by the shutter sensor 314. When the answer to the decision is affirmative, this indicates that exposure has been made, then another decision is made at step S20 as to whether the zooming-up flag Fzu is up. When the answer to the decision is affirmative, this indicates that focusing the zoom lens has been made by rotating the lens drive motor 318 in the reverse direction, namely the direction for zooming-down, then CPU 303 provides the driver IC 300 with an actuation signal to actuate the lens drive motor 318 to rotate in the normal direction so as to return the zoom lens to one of the fixed zoom-up positions at step S21 until return of the zoom lens to the fixed zoom-up position previously occupied is detected at step S22. When the zoom lens returns to the fixed zoom-up position previously occupied, CPU 303 provides the driver IC 300 with a stop signal to stop the lens drive motor 318 at step S23. On the other hand, when the answer to the decision concerning the zooming-up flag Fzu made at step S20 is negative, this indicates that focusing the zoom lens has been made by rotating the lens drive motor 318 in the normal direction, namely the direction for zooming-up, then CPU 303 provides the driver IC 300 with an actuation signal to actuate the lens drive motor 318 to rotate in the reverse direction so as to return the zoom lens to one of the fixed zoom-down positions at step S24 until return of the zoom lens to fixed zoom-down position previously occupied is detected at step S25. When the zoom lens returns to the fixed zoom-down position previously occupied, CPU 303 provides the driver IC 300 with a stop signal to stop the lens drive motor 318 at step S26.

When the answer to the decision concerning exposure made at step S19 is negative or subsequently to stopping the lens drive motor 318 at step S23 or S26, the sequence logic is ended.

Figure 16A:
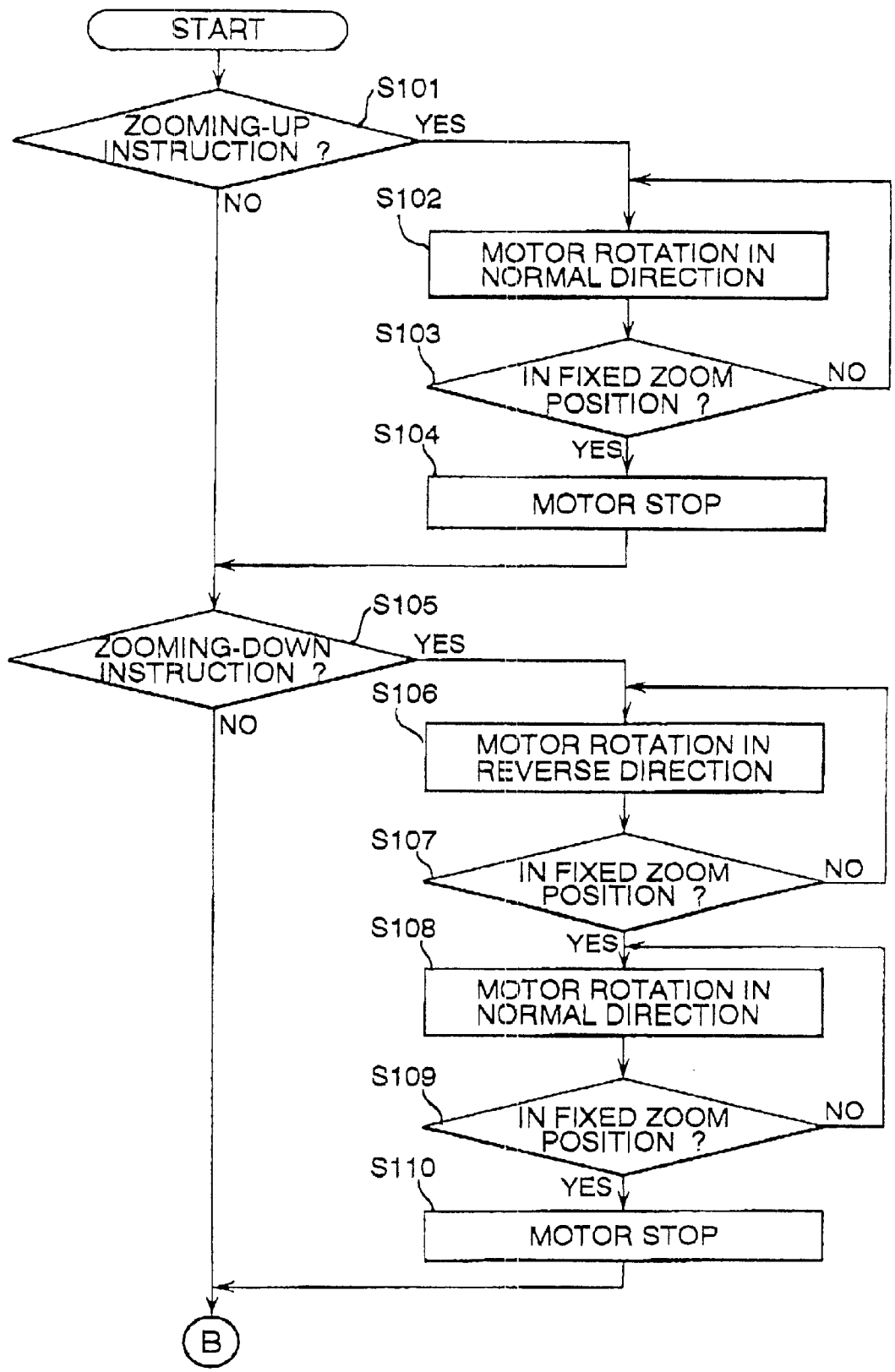
FIGS. 16A and 16B are a flow chart illustrating another sequence routine of zoom lens control.
Figure 16B:
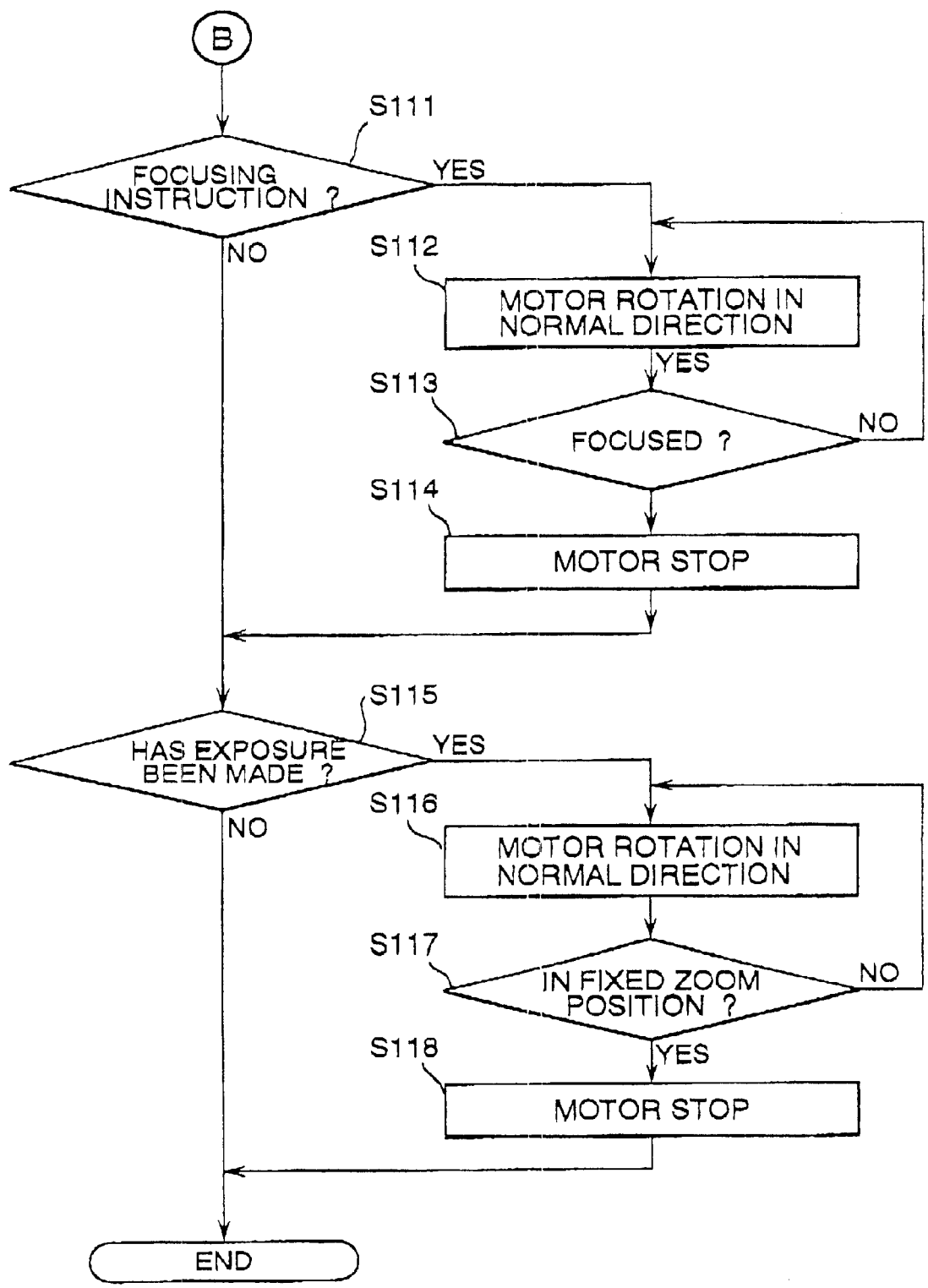

FIGS. 16A and 16B are another flow chart illustrating a sequence routine of zoom lens control for CPU 303. The program for the zoom lens control sequence routine is implemented whenever the zoom lens is driven irrespective of focusing or zooming.

When the sequences logic starts and control proceeds to a functional block at step S101 where a decision is made as to whether a zooming-up instruction signal is provided from CPU 303. When the answer to the decision is affirmative, this indicates that the zooming lever 18 at the zooming-up operative end 18a is pushed, which is detected through turn-on of the zooming switch 310, then CPU 303 provides the driver IC 300 with and actuation signal to actuate the lens drive motor 318 to rotate in the normal direction, namely the direction for zooming-up, while the zooming lever 18 remains pushed down at step S102. When the zoom lens reaches one of the fixed zoom-up position after releasing the zooming lever 18, which is detected by the zoom position switch 314, that is, when the answer to a decision made at step S103 is affirmative, then CPU 303 provides the driver IC 300 with a stop signal to stop the lens driver motor 318 at step S104. When the answer to the decision concerning a zooming-up instruction signal made at step S101 is negative or subsequently to stopping the lens drive motor 318 at step S104, a decision is made at step S105 as to whether a zooming-down instruction signal is provided from CPU 303. When the answer to the decision is affirmative, CPU 303 provides the driver IC 300 with an actuation signal to actuate the lens drive motor 318 to rotate in the reverse direction while the zooming lever 18 remains pushed down at step S106 until the zoom lens reaches forward one of the fixed zoom-down position after releasing the zooming lever 18 at step S107, When the zoom lens reaches the forward fixed zoom-down position, then CPU 303 provides the driver IC 300 with an actuation signal to actuate the lens drive motor 318 to rotate in the normal direction so as to shift the cam follower pin 132 of the rear lens holder 131 to the zooming-up cam section through one of the focusing cam sections extending the forward fixed zoom-down position at step S108, thereby locating the rear lens group 130, and hence the zoom lens, in the corresponding fixed zoom-up position at step S108. When the zoom lens reaches the corresponding fixed zoom-up position at step S109, CPU 303 provides the driver IC 300 with a stop signal to stop the lens drive motor 318 at step S110.

When the answer to the decision concerning a zooming-down instruction signal made at step S105 is negative or subsequently to stopping the lens drive motor 318 at step S110, a decision is made at step S111 as to whether a focusing instruction signal is provided from CPU 303. When the answer to the decision is affirmative, CPU 303 provides the driver IC 300 with an actuation signal to actuate the lens drive motor 318 to rotate in the reverse direction at step S112 until a given number of drive pulses in conformity with an object distance detected by the automatic focusing system have been counted up at step S113. In response to counting up the given number of pulses, CPU 303 provides the driver IC 300 with a stop signal to stop the lens drive motor 318 for completing focusing operation after zooming operation at step S114.

When the answer to the decision concerning a focusing instruction signal made at step S111 is negative or subsequently to stopping the lens drive motor 318 at step S114, a decision is made at step S115 as to whether exposure has been made, When the answer to the decision is affirmative, CPU 303 provides the driver IC 300 with an actuation signal to actuate the lens drive motor 318 to rotate in the normal direction at step S116 until the zoom lens returns to the fixed zoom-up position having been occupied before the focusing at step S117. Subsequently, CPU 303 provides the driver IC 300 with a stop signal to stop the lens drive motor 318 at step S118. When the answer to the decision concerning exposure made at step S115 is negative or subsequently to stopping the lens drive motor 318 at step S118, the sequence logic is ended.

Although the present invention has been described in detail in connection with a camera equipped with a zoom lens by way of example, it can be applied in various optical instruments equipped with a zoom lens such as an electronic camera, a video camera, an overhead projector, a regular projector and the like.

It will, of course, be understood that various changes may be in the form, details, arrangement and proportion of parts without departing from the scope of the present invention, which generally stated, consists in the matter set forth in the following claims.

What is claimed is:

1. An optical instrument equipped with a zoom lens which comprises a plurality of lens groups including at least a first lens group and a second lens group axially movable relatively to each other for focusing said zoom lens, said zoom lens comprising:
    a lens barrel;
    zooming guide path means provided in said lens barrel for guiding axially said first lens group when moving said second lens group in one of axial directions for zooming said zoom lens;
    focusing guide path means provided in said lens barrel and intersecting said zooming guide path means for guiding axially said first lens group when moving said second lens group in another said axial direction for focusing said zoom lens on an aimed object; and
    connecting means for operationally interconnecting said first lens group to said zooming guide path means and said focusing guide means.

2. An optical instrument equipped with a zoom lens of a type having a plurality of fixed zoom positions which comprises a plurality of lens groups including at least a first lens group and a second lens group axially movable relatively to each other, said first lens group being axially movable relatively to said second lens group for focusing in each said fixed zoom position, said zoom lens comprising;
    a lens barrel;
    a zooming-up guide path provided in said lens barrel and having said fixed zoom positions along which said first lens group is guided to move in a zooming-up direction and positioning said first lens group in one of said fixed zoom positions for zooming-up said zoom lens;
    a zooming-down guide path provided in said lens barrel and having said fixed zoom positions along which said first lens group is guided to move in a zooming-down direction and positioning said first lens group in one of said fixed zoom position for zooming-down said zoom lens, said zooming-down guide path being arranged parallel to said zooming-up guide path;
    a plurality of focusing guide paths provided in said lens barrel and arranged parallel to one another and connection said zooming-up guide path and said zooming-down guide path at said fixed zoom positions, respectively, each said focusing guide path axially guiding and shifting said first lens group relatively to said second lens group for focusing said zoom lens on an aimed object; and
    connecting means for keeping operational interconnection of said first lens group to said zooming-up guide path, said zooming-down guide path and said focusing guide paths.

3. An optical instrument equipped with a zoom lens as defined in claim 2, wherein said zooming-up guide path, said zooming-down guide path and said focusing guide path comprise cam grooves, respectively, which are connected to one another and said connecting means comprises a cam follower urged against said cam grooves, said cam groove for said zooming-up guide path being provided with steps in said fixed zoom positions on said zooming-up guide path that prevent said come follower from moving beyond said fixed zoom position on said zooming-up guide path and forcing said cam follower to enter said cam groove for said focusing guide path when zooming down said zoom lens and when focusing said zoom lens after zooming up said zoom lens, and said cam groove for said zooming-down guide path being provided with steps in said fixed zoom positions on said zooming-down guide path that prevent said come follower from moving beyond said fixed zoom position on said zooming-down guide path and forcing said cam follower to enter said cam groove for said focusing guide path when zooming up said zoom lens and when focusing said zoom lens after zooming down said zoom lens.

4. An optical instrument equipped with a zoom lens as defined in claim 2, wherein said zooming-up guide path, said zooming-down guide path and said focusing guide paths comprise cam grooves, respectively, which are connected to one another and said connecting means comprises a cam follower configured so as to move in said cam grooves for said zooming-up guide path and said zooming-down guide path keeping in contact with a wall of each of said cam grooves for said zooming-up guide path and said zooming-down guide path that is remote from said cam grooves for said focusing guides paths and shifting toward a wall of each of said cam groove for said zooming-up guide path and said zooming-down guide path that is adjacent to said cam grooves for said focusing guide paths so as to enter said cam grove for said focusing guide path when zooming down said zoom lens from one of said fixed zoom position along said zooming-up guide path or zooming-up said zoom lens from one of said fixed zoom position along said zooming-down guide path and when focusing said zoom lens after zooming down said zoom lens.

5. An optical instrument equipped with a zoom lens as defined in claim 2, and further comprising a reversible motor for driving said lens barrel in opposite directions to zoom up or down said zoom lens and focus said zoom lens and motor control means for controlling said reversible motor to rotate in one of said opposite directions so as to move said first lens group along said cam groove for zooming-up guide path,, thereby placing said zoom lens in a desired one of said fixed zoom position on said zooming-up guide path, to rotate in another of said opposite directions so as to move said first lens group along one of said cam grooves for said focusing guide paths adjacent to said desired fixed zoom position on said zooming-up guide path, thereby focusing said zoom lens after zooming up said zoom lens, to rotate in said another direction so as to move said first lens group along said cam groove for zooming-down guide path, thereby placing said zoom lens in a desired one of said fixed zoom position on said zooming-down guide path, and to rotate in said one direction so as to move said first lens group along one of said cam grooves for said focusing guide paths adjacent to said desired fixed zoom position on said zooming-down guide path, thereby focusing said zoom lens after zooming down said zoom lens.

6. An optical instrument equipped with a zoom lens as defined in claim 2, and further comprising a reversible motor for driving said lens barrel in opposite directions to zoom up or down said zoom lens and focus said zoom lens and motor control means for controlling said reversible motor to rotate in one of said opposite directions so as to move said first lens group along said cam groove for zooming-up guide path,, thereby placing said zoom lens in a desired one of said fixed zoom position on said zooming-up guide path, to rotate in another of said opposite directions so as to move said first lens group along said cam groove for zooming-down guide path, thereby placing said zoom lens in a desired one of said fixed zoom position on said zooming-down guide path, to rotate in said one direction so as to move said first lens group along one of said cam grooves for said focusing guide paths adjacent to said desired fixed zoom position on said zooming-down guide path until said zoom lens is placed in one of said fixed zoom position on said zooming-up guide path that is adjacent to said one focusing guide path subsequently to zooming down said zoom lens, and to rotate in said one direction so as to move said first lens group along one of said cam grooves for said focusing guide paths for focusing said zoom lens.

\* \* \* \* \*